United States Patent [19]

Collier, Jr. et al.

[11] Patent Number: 5,787,864

[45] Date of Patent: Aug. 4, 1998

[54] HYDROGEN ENRICHED NATURAL GAS AS A MOTOR FUEL WITH VARIABLE AIR FUEL RATIO AND FUEL MIXTURE RATIO CONTROL

[75] Inventors: Robert Kirk Collier, Jr., Merritt Island; Robert Louis Hoekstra, Oviedo; David Neal Mulligan, Titusville; Douglas Edward Hahn, Melbourne, all of Fla.

[73] Assignee: University of Central Florida, Orlando, Fla.

[21] Appl. No.: 771,647

[22] Filed: Dec. 21, 1996

Related U.S. Application Data

[60] Division of Ser. No. 428,626, Apr. 25, 1995, Pat. No. 5,666,923, and a continuation-in-part of Ser. No. 237,900, May 4, 1994.

[51] Int. Cl.⁶ .................................................. F02M 67/06
[52] U.S. Cl. .................... 123/492; 123/436; 123/443; 123/527; 123/DIG. 12
[58] Field of Search ................................ 123/527, 436, 123/683, 675, 443, 492

[56] References Cited

U.S. PATENT DOCUMENTS

| | | | |
|---|---|---|---|
| 4,284,053 | 8/1981 | Merrick | 123/492 |
| 4,520,763 | 6/1985 | Lynch et al. | 123/1 A |
| 4,873,961 | 10/1989 | Tanaka | 123/492 |
| 4,908,765 | 3/1990 | Murakami et al. | 123/492 |
| 5,139,002 | 8/1992 | Lynch et al. | 123/DIG. 12 |
| 5,483,939 | 1/1996 | Kamura et al. | 123/492 |

*Primary Examiner*—Erick R. Solis
*Attorney, Agent, or Firm*—Brian S. Steinberger; Law Offices of Brian S. Steinberger

[57] ABSTRACT

A hydrogen and natural gas fuel mixture for internal combustion engines is provided for vehicle engines such as those used in standard production engines for automobiles, trains and lawn mowers. The gaseous fuel for operating a vehicle combustion engines includes approximately 21 to 50% Hydrogen and the rest natural gas constituents such as combinations of Methane, Carbon Dioxide, Nitrogen, Ethane, Propane, Iso-Butane, N-Butane, Iso Pentane, N-Pentane, and Hexanes Plus. A fuel mixture of approximately 28 to 36 percent Hydrogen and a air fuel equivalence ratio of approximately 0.625 is an extreme lean burn condition that yields hydrocarbon emission levels of less than approximately 104 ppm(0.84 hm/hp hr.). Current internal combustion engines that are in mass production can take this alternative fuel without any substantial modifications to their systems. This alternative fuel is lean burning and emits emissions that are below current legal standards. The novel fuel mixture can be used in internal combustion engines for automobiles, lawnmowers, and trains. A control system for allowing the internal combustion engines to operate at extreme lean burn conditions is also provided for use with both a carburetor and fuel injection system. For a carburetor system, a secondary demand regulator system can kick in when a throttle is wide open and will allow additional fuel to pass through the system to meet instantaneous power demands such that occur when full throttle depression is insufficient for severe grade climbing, expressway merging, passing and the like. The fuel injection system can also be programed with a control algorithm that will select air fuel ratios. The computer control can increase fuel with respect to air when the throttle reaches a selected point of travel. The computer control can also dynamically change the hydrogen and natural gas fuel mixture ratio dynamically while the vehicle is being operated based on engine power demands and emissions.

9 Claims, 23 Drawing Sheets

EXHAUST EMISSIONS FOR NATURAL GAS AND HYDROGEN MIXTURES

Fig. 17 EXHAUST EMISSIONS FOR NATURAL GAS AND HYDROGEN MIXTURES

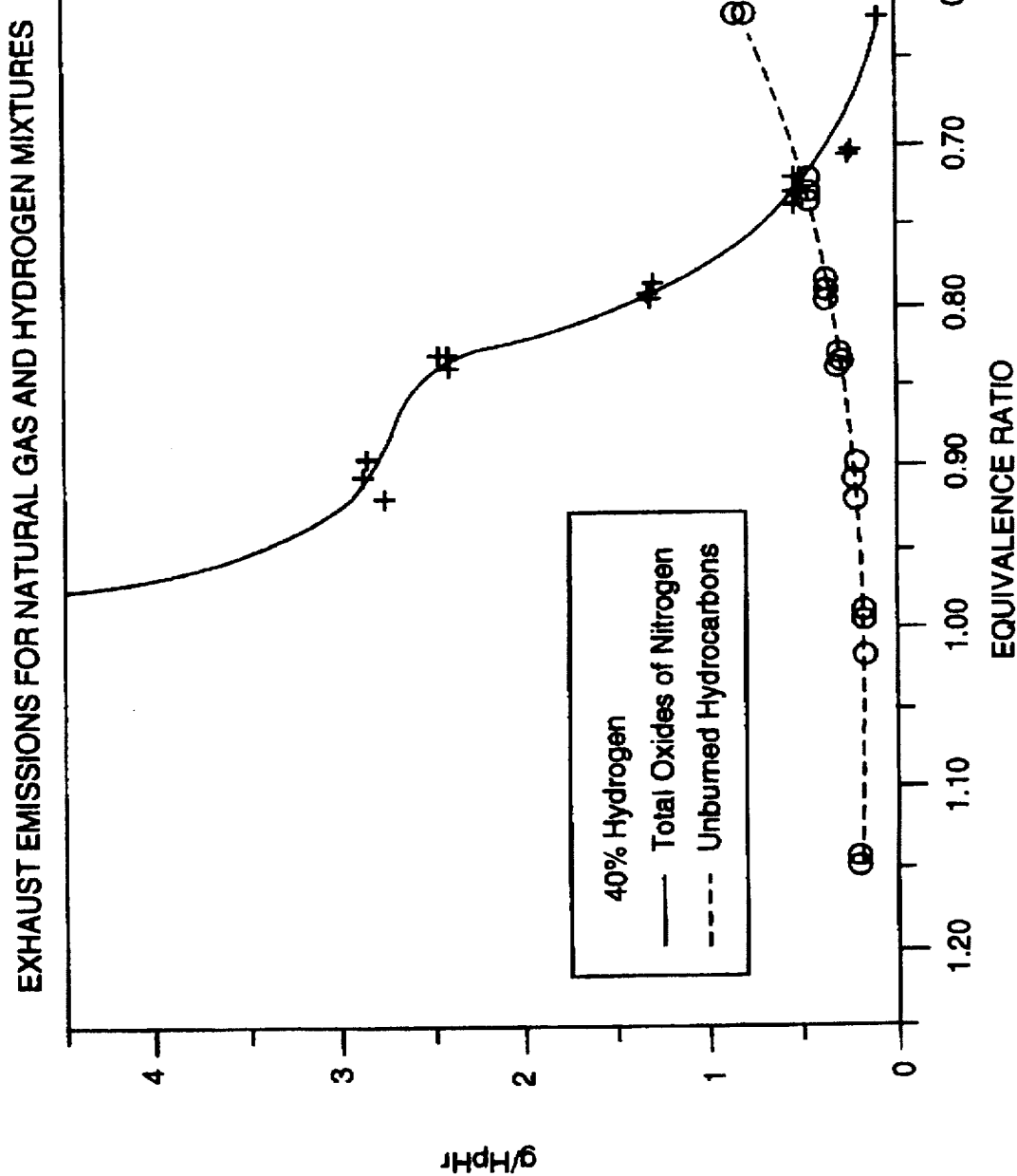

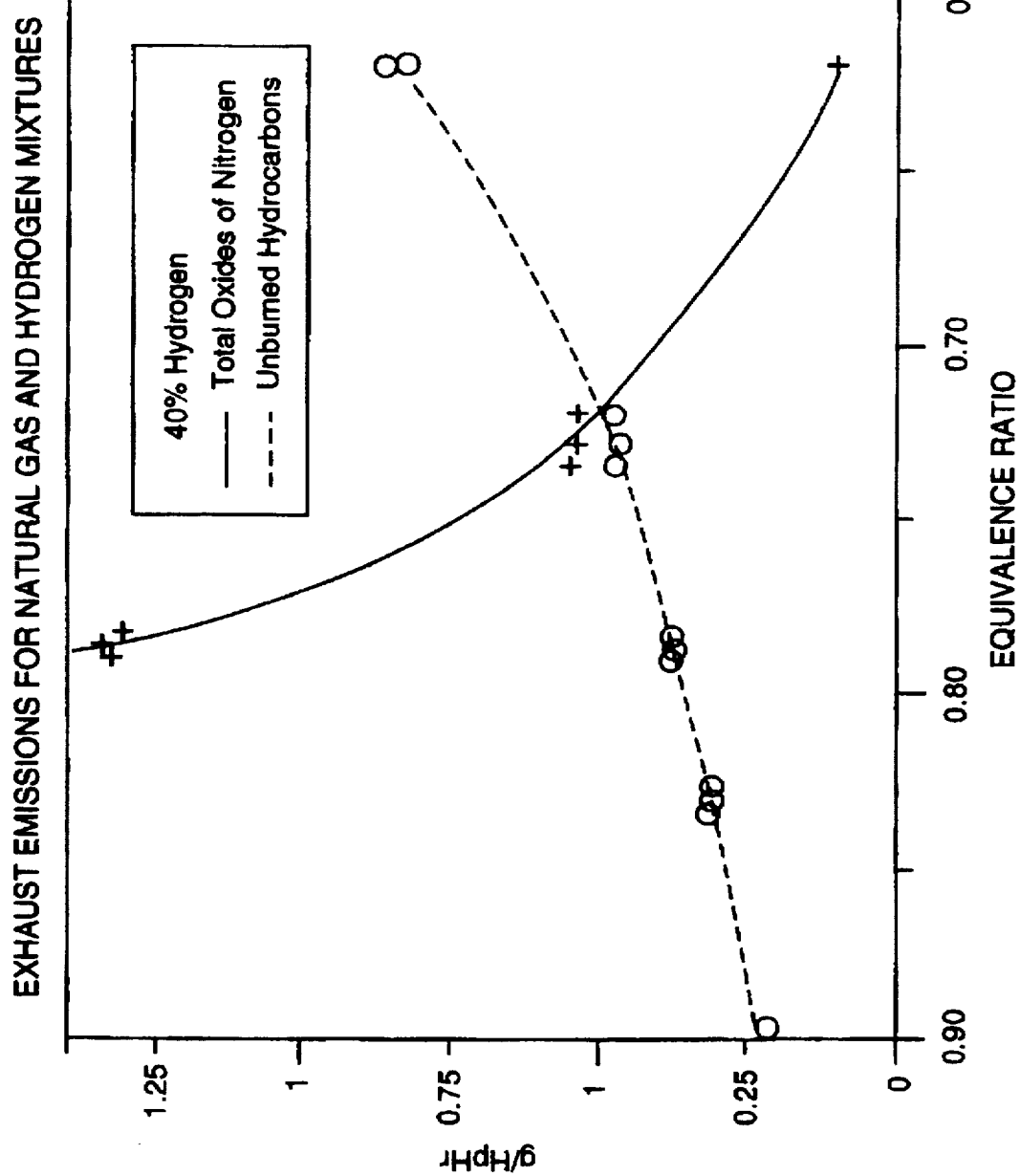

N = Engine rpm
Q = Mass Air Flow
$F_f$ = Mass Fuel Flow
$T_p$ = Throttle position
$dT_p/dt$ = Velocity of $T_p$
$d^2T_p/dt^2$ = Acceleration of $T_p$
$AF_d$ = Desired Air Fuel
$AF_a$ = Actual Air Fuel
$C_{pr}$ = In-cylinder pressure
$\overline{C}_{pr}$ = Average $C_{pr}$
$\sigma C_{pr}$ = Standard deviation of $C_{pr}$ $$Z = \frac{|C_{pr} - \overline{C}_{pr}|}{\sigma}$$

Pw = Pulse width of injector

HYDROGEN ENRICHED NATURAL GAS AS A MOTOR FUEL WITH VARIABLE AIR FUEL RATIO AND FUEL MIXTURE RATIO CONTROL

This is a Divisional of Application Ser. No. 08/428,626 filed Apr. 25, 1995, now U.S. Pat. No. 5,666,923.

This invention is a Continuation-In-Part to U.S. Application Ser. No. 08/237,900 entitled Hydrogen Enriched Natural Gas as a Clean Motor Fuel filed on May 4, 1994.

This invention relates to mobile vehicle fuels, and in particular to a hydrogen and natural gas mixture used as a fuel for combustion engines and a lean burn throttle control algorithm to optimize a vehicle emissions and power. This invention was funded in part under contract no. DCA 92SE20061505026 from the Florida Energy Office.

BACKGROUND AND PRIOR ART

Due to the world's depleting reserves of fossil fuels such as oil, there exists a need for alternative fuel vehicles (AFV's). The Energy Policy Act (EPACT) signed by President Bush in 1992 requires that states and the federal government take steps to reduce energy use and to shift to other sources of energy, including the addition of alternative fuel vehicles(AFV's) to federal and state fleets. Individual states such as California and New York have instituted goals of near-zero emission standards for percentages of new vehicles sold within those states in the near future. Thus, the need exists for alternative fuels.

Natural gas has long been considered an excellent alternative fuel since it is considered much cleaner than other fossil fuels such as oil, and its reserves are much larger than crude oil. Natural gas which is primarily composed of methane and combinations of Carbon Dioxide, Nitrogen, Ethane, Propane, Iso-Butane, N-Butane, Iso Pentane, N-Pentane, and Hexanes Plus, is a renewable energy source since anaerobic bacterial eventually will convert all plants into methane type gas. Natural gas has an extremely high octane number, approximately 130, thus allowing higher compression ratios and broad flammability limits.

A problem with using natural gas is reduced power output when compared to gasoline, due mostly to the loss in volumetric efficiency with gaseous fuels, as well as the lack of the infrastructure for fueling natural gas vehicles. Another problem area is the emissions produced by these natural gas vehicles. Although, the emissions are potentially less than that of gasoline vehicles, these vehicles generally require some types of emissions controls such as exhaust gas recirculation(EGR), positive crankcase ventilation(PCV), and/or unique three-way catalyst. A still another problem with using natural gas vehicles is the slow flame speed which requires that the fuel be ignited substantially before top dead center (BTDC). In general, most internal combustion engines running on gasoline operate with a spark advance of approximately 35 degrees BTDC where as the same engine operating on natural gas will require an approximate advance of 50 degrees BTDC. The slower burn rate of the fuel results in reduced thermal efficiency and poor burn characteristics.

Proposed alternative fuels utilizing hydrogen and fossil fuels have also been used with resulting problems. In an article entitled Houseman et al., "A Two-Charge Engine Concept: Hydrogen Enrichment" SAE Paper #741169 (1974), research was conducted at the Jet Propulsion Laboratory. The researchers ran a V-8 internal combustion engine on a mixture of gasoline and hydrogen. The addition of hydrogen allowed the engine to be operated much leaner than was possible on gasoline alone. The result of this research was that $NO_x$ emissions were reduced below the 1977 EPA standard of 0.4 gm per mile. The article states that "At an equivalence ratio of 0.53, very low $NO_x$ and CO were produced and engine thermal efficiency was substantially increased over stock gasoline configurations. The article mentions that in order to "operate a vehicle on fuel mixtures of gasoline and hydrogen, an onboard source of hydrogen is required. Onboard storage of hydrogen, either as a compressed gas, as a liquid at cryogenic temperature, or as a hydride is not a practical solution today. Direct generation of hydrogen from gasoline in an onboard reactor was selected as the best solution to the problem." The main problem with this device was that the reactor described has not been adopted due to the complexity of the device.

The articles by MacDonald, J. S.,entitled "Evaluation of the Hydrogen Supplemented Fuel Concept with an Experimental Multicylinder Engine" Automotive Engineering Congress and Exposition, SAE Paper #760101 (1976), and by Parks , F. B., entitled " A Single-Cylinder Engine Study of Hydrogen-Rich Fuels" Automotive Engineering Congress and Exposition, SAE Paper #760099 (1976) were by authors from General Motors that also investigated the use of hydrogen-enriched gasoline. Reflecting on Houseman et al.'s work, MacDonald states that, "while this approach (hydrogen reactor) as been shown to be feasible, it does have its limitations. A problem is the maximum theoretical yield of hydrogen per pound of fuel is about 14% by weight. Another problem is the hydrogen generator is at best only 80% efficient, so that any gasoline going to the generator represents an efficiency loss, which is a loss in fuel economy. For these reasons it is desirable to keep the quantity of hydrogen required for acceptable engine operation to a minimum. This article goes on to report that when 14.4% of the fuel mass was hydrogen the engine operated satisfactorily with an equivalence ratio of 0.52 and the $NO_x$ levels had dropped below the EPA mandated level of 0.4 gm per mile.

Several U.S. patents have incorporated similar concepts. For example, U.S. Pat. No. 4,376,097 to Emelock describes a hydrogen generator for motor vehicles. U.S. Pat. No. 4,508,064 to Watanabe describes a customized engine for burning hydrogen gas. U.S. Pat. No. 5,176,809 to Simuni describes a technique of producing and recycling hydrogen from exhaust gases.

Some research has been conducted for combining hydrogen and natural gas as a fuel mixture. Articles by Nagalingam et al. entitled: "Performance Study Using Natural Gas, Hydrogen-Supplemented Natural Gas and Hydrogen in AVL Research Engine", International Journal of Hydrogen Energy, Vol 8, No. 9, pp. 715–720, 1983; Fulton et al. entitled: "Hydrogen for Reducing Emissions from Alternative Fuel Vehicles" 1993 SAE Future Transportation Conference, SAE Paper from Alternative Fuel Vehicles" 1993 SAE Future Transportation Conference, SAE Paper #931813, (1993) and an article by Yusuf entitled: "In Cylinder Flame Front Growth Rate Measurement of Methane and Hydrogen Enriched Methane Fuel in a Spark Ignited Internal Combustion Engine, Unpublished Masters Theseis, University of Miami (1990) each disclosed such combinations of a fuel mixture. However, the mixtures were generally limited to 20% hydrogen and the rest generally methane.

U.S. Pat. No. 5,139,002 to Lynch et al., states that hydrogen enriched mixtures should only contain mixtures of up to levels of between "10 and 20%." See column 9, lines 49–60, and column 16, lines 14–21. At column 9, lines 37–60, Lynch et al. states that "Relatively few tests were necessary to rule out the 25% and 30% mixtures(of hydrogen) . . . "

Despite its clean burning characteristics, the utilization of hydrogen has had many problems as an alternative fuel. Primarily, the use of hydrogen in vehicles has been limited by the size, weight, complexity and cost of hydrogen storage options as well as the cost of hydrogen.

The controlling of air/fuel ratios and engine power has been limited in past applications. Generally, a spark ignition (SI) engine's power is controlled through a process called throttling. Throttling controls the volume of air that enters a combustion engine. The throttle system is formed from one or more throttle blades which are placed in the air inlet stream. During a "closed throttle" position also referred to as IDLE, the throttle blade closes off the air inlet and the only air entering the engine is leakage passing through the blades. Alternatively, the only air entering the engine can be air passing through a small hole in the throttle blade to provide a minimum amount of air to the engine. When the throttle is wide open, the throttle blade is parallel to the air stream and it presents a minimal air restriction to the incoming air. Most often the throttle blade is between full open and fully closed thus presenting a controlled restriction to the air passage.

Fuel in a spark ignition(SI) engine is generally introduced into the inlet air stream to provide the air fuel mixture for combustion. Various methods have been used for introducing the fuel into the air. For example, the carbureted SI engine is the most common method for automotive applications. Here, the carburetor controls the amount of fuel injected into the air stream by the fuel orifice size and the pressure drop across a venturi. To increase the amount of fuel to be injected given a constant pressure drop, the size of the jet was increased. With a fixed jet size, the amount of fuel entering the air stream remained virtually proportional to the pressure drop across the ventur. Thus, the pressure drop across the ventur was a function of throttle position.

An alternative known method of introducing fuel into the air stream is a fuel injector. The fuel injector can be located in a common plenum which feeds all of the cylinders on a multicylinder engine. At this location, the engine is said to be "throttle body injected." The injectors can alternatively be located in the intake runners feeding the individual runners. This type of injection is referred to as "port injection."

In both the throttle body and the port injection systems a sensor is needed to measure the amount of air entering the engine in order to control the injectors and produce a constant air/fuel ratio over the full range of throttle openings. Generally the output signal from a pressure sensor or a flow sensor is fed to a computer which uses the analog of the air flow from the sensor to control the length of time the injector is to be open and thus control the air/fuel ratio. Additional sensors have also been included to measure throttle position and exhaust oxygen content. Output from these sensors also can control the air/fuel ratio.

Power output of an engine has also been controlled strictly by the amount of fuel introduced into the combustion chamber just prior to ignition. In compression ignition(CI) engines also referred to as "Diesel Engines", the CI engine does not usually have a throttle. Air entering the engine is only restricted by the intake manifold design. Fuel is injected directly into the cylinder of the CI engine just prior to ignition. The ignition is caused by the high heat generated during the compression stroke.

Examples of the above prior art can be found in U.S. Pat. Nos.: 3,982,878 to Yamane et al.; 4,184,461 to Leung; 4,213,435 to Simko; 4,244,023 to Johnson; 4,406,261 to Ikeura 4,471,738 to Smojver; 4,512,304 to Snyder; and 4,730,590 to Sogawa.

Operating an engine at lean burn was attempted by U.S. Pat. No. 4,499,872 to Ward et al. However, the Ward system is restricted to an adiabatic engine design and requires elaborate structural components and connections such as a microwave generator in order to operate.

SUMMARY OF THE INVENTION

The first objective of the present invention is to provide a hydrogen and natural gas mixture that can extend the lean combustion limits of natural gas as a motor fuel.

The second object of this invention is to provide a hydrogen and natural gas mixture that substantially reduces the harmful exhaust emissions produced by conventional combustion engines.

The third object of this invention is to provide a hydrogen and natural gas mixture that can be used in existing gaseous vehicles without major modification and additions to those vehicles.

The fourth object of this invention is to provide a hydrogen and natural gas mixture that can meet long term federal and state emission requirements.

The fifth object of this invention is to provide a hydrogen and natural gas fuel mixture that optimizes the cost of the fuel against exhaust emissions.

The sixth object of this invention is to provide a hydrogen and natural gas fuel mixture that contains approximately 21 to 50% hydrogen and the rest natural gas such as methane.

The seventh object of this invention is to provide a computer controlled method of controlling the variable air/fuel ratio of a standard internal combustion engine in order to achieve lean burn.

The eighth object of this invention is to provide a throttle control to achieve lean burn in a standard internal combustion engine.

The ninth object of the invention is to provide a control to maintain the air fuel ratio to optimize power, efficiency and emissions as defined by the California Air Resources Board for an Ultra Low Emissions Vehicle and for a near Zero Emissions Vehicle from a closed blade throttle to a fully open blade throttle position.

The tenth object of this invention is to provide a system to increase the fuel to air ratio ($\phi$) as a function of power demand after the engine throttle is fully open.

The eleventh object of this invention is to provide a method of determining the amount of fuel to air enrichment using a multi-criteria decision analysis algorithm optimized to minimize emissions while creating sufficient power to meet demand.

The twelfth object of this invention is to provide a method a method for adjusting the hydrogen and methane fuel mixture ratio based on engine power demands and emissions.

A preferred embodiment of the invention is to provide a hydrogen and natural gas fuel mixture where the percent of hydrogen is approximately twenty-one up to fifty percent of the mixture. The natural gas portion of the fuel can include constituents such as combinations of Methane, Carbon Dioxide, Nitrogen, Ethane, Propane, Iso-Butane, N-Butane, Iso Pentane, N-Pentane, and Hexanes Plus. Current internal combustion engines that are in mass production can take this alternative fuel without any substantial modifications to their systems. This alternative fuel is lean burning and emits emissions that are below current legal standards. Specific mixture ratios of utilizing the mixture ratios are disclosed for an internal combustion engine for a vehicle.

A computer algorithm is disclosed that determines the amount of fuel to air enrichment necessary to meet sufficient power demands of an internal combustion engine's throttle while minimizing emissions. The power demand is determined by a computer algorithm whose input is the throttle position sensor. The position, the velocity and the acceleration of the throttle pedal after the throttle blades are fully open will be measured and computed to determine minimum fuel enrichment. In addition to fuel enrichment the spark timing will be varied to optimize power enhancement while minimizing emissions. The system can be operated in an open loop configuration utilizing lookup tables that depend upon engine configuration. Various engine configurations included for the lookup tables can include but are not limited to cylinder size(4,6,8,10,12), cylinder displacement and head dimensions. Alternatively the system can be operated using exhaust gas emission monitoring on board the vehicle using sensors such as $NO_x$, CO, $CO_2$, $O_2$, THC (Total hydrocarbon), NMOG(Nonmethane organic compounds). The system can use in-cylinder pressure transducers to measure engine power output as a feedback device to close the control loop with the throttle position sensor and algorithm or the system can be operated in the open loop configuration. In addition the in-cylinder pressure transducer can be utilized to measure cylinder misfire and modify the air fuel ratio in each cylinder of the engine further optimizing emission and power output. The fuel mixture of hydrogen and natural gas can be adjusted dynamically to the engine based on engine demand and emissions.

Further objects and advantages of this invention will be apparent from the following detailed description of a presently preferred embodiment which is illustrated schematically in the accompanying drawings.

BRIEF DESCRIPTION OF THE FIGS.

FIG. 19 shows a graph of exhaust emissions for natural gas and 40% hydrogen mixtures in grams per horse power hour(g/HpHr) vs. Equivalence ratio.

FIG. 20 shows an enlarged sectional graph of FIG. 19 of exhaust emissions for natural gas and 40% hydrogen mixtures in grams per horse power hour(g/HpHr) vs. Equivalence ratio.

DESCRIPTION OF THE PREFERRED EMBODIMENT

Figure 1:
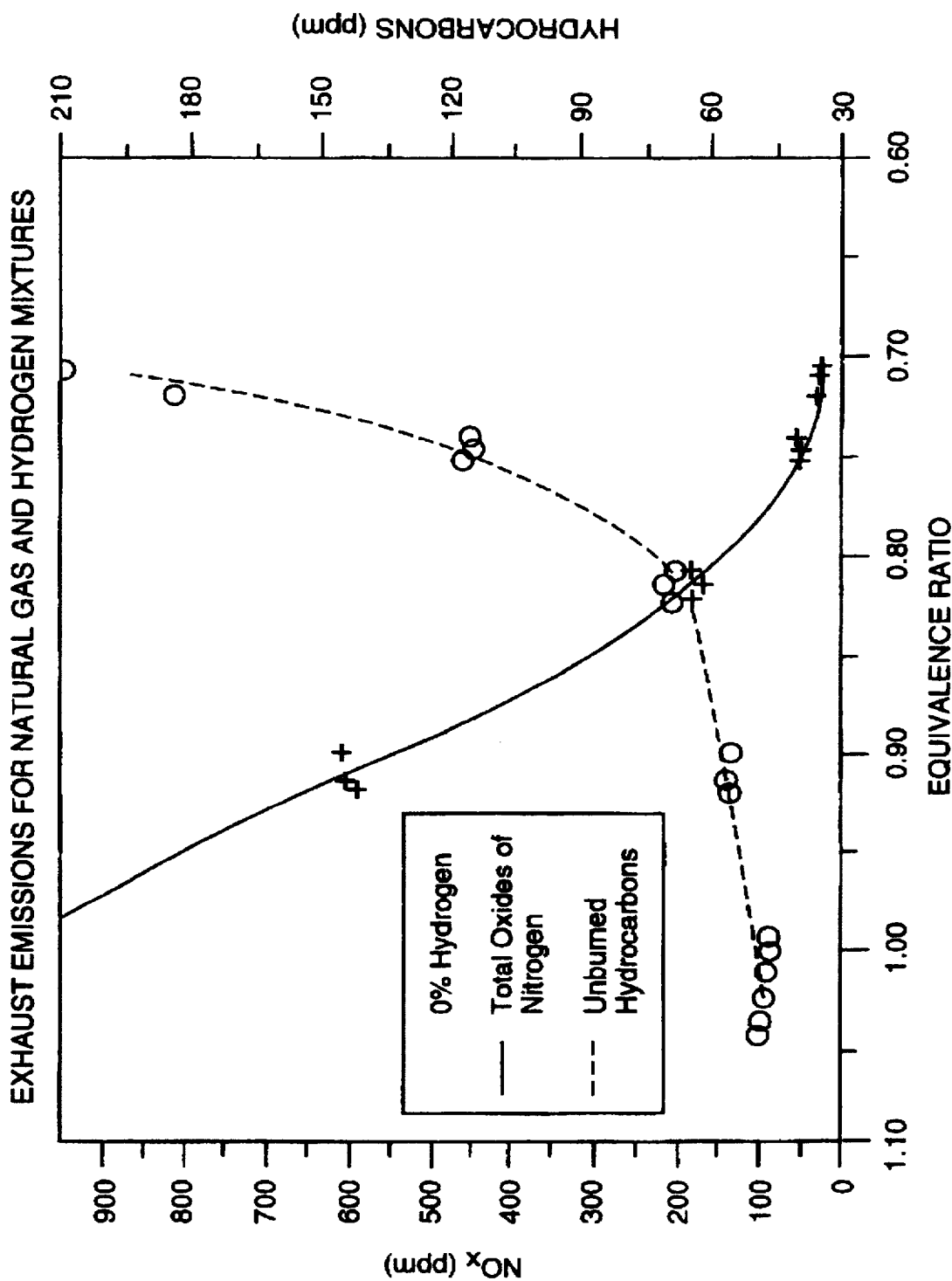
FIG. 1 shows a graph of exhaust emissions for natural gas and 0% hydrogen mixtures in parts per million(PPM) vs. Equivalence Ratio.
Figure 2:
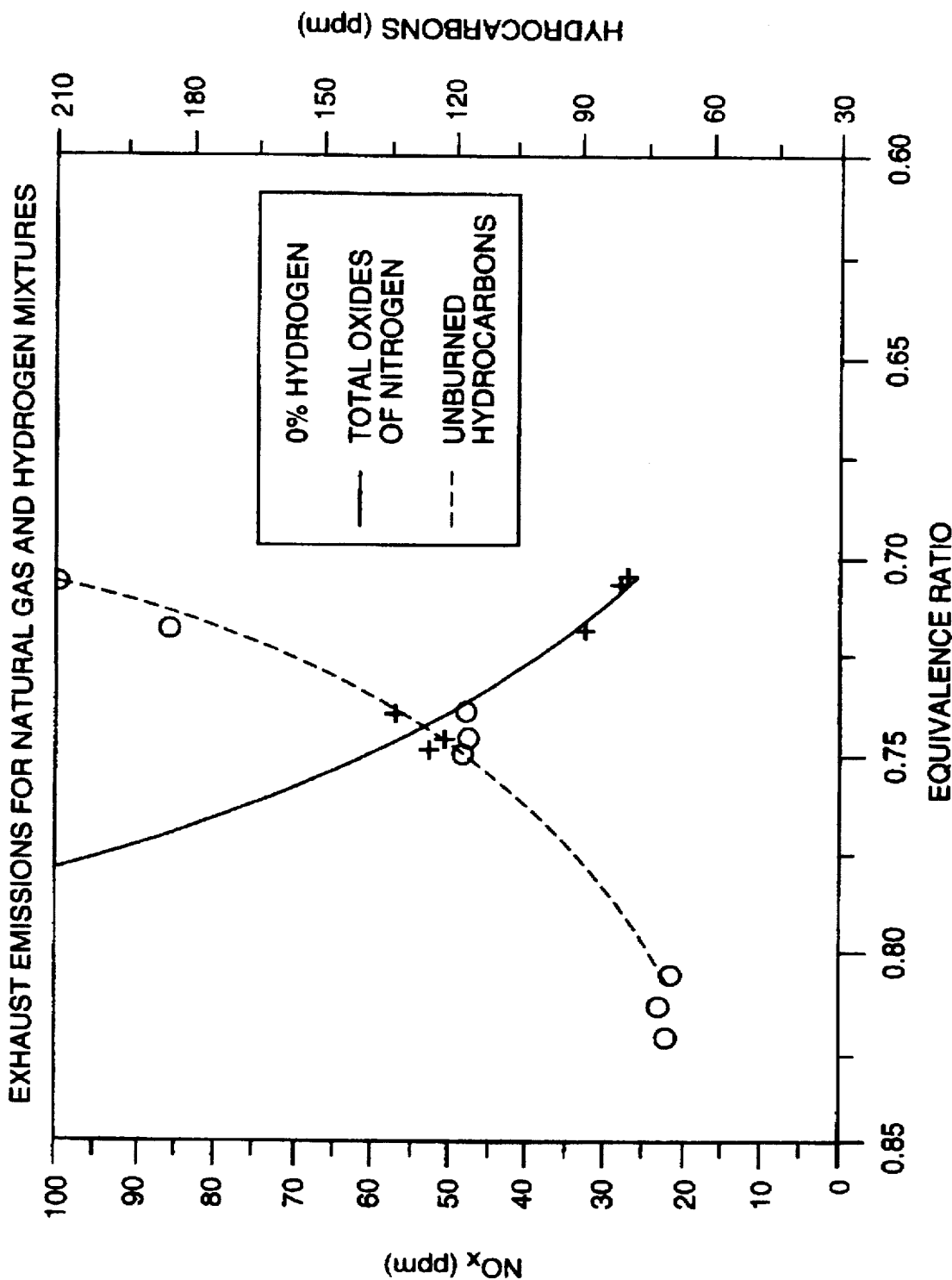
FIG. 2 shows an enlarged sectional graph of FIG. 1 of exhaust emissions for natural gas and 0% hydrogen mixtures in parts per million(PPM) vs. Equivalence Ratio.
Figure 3:
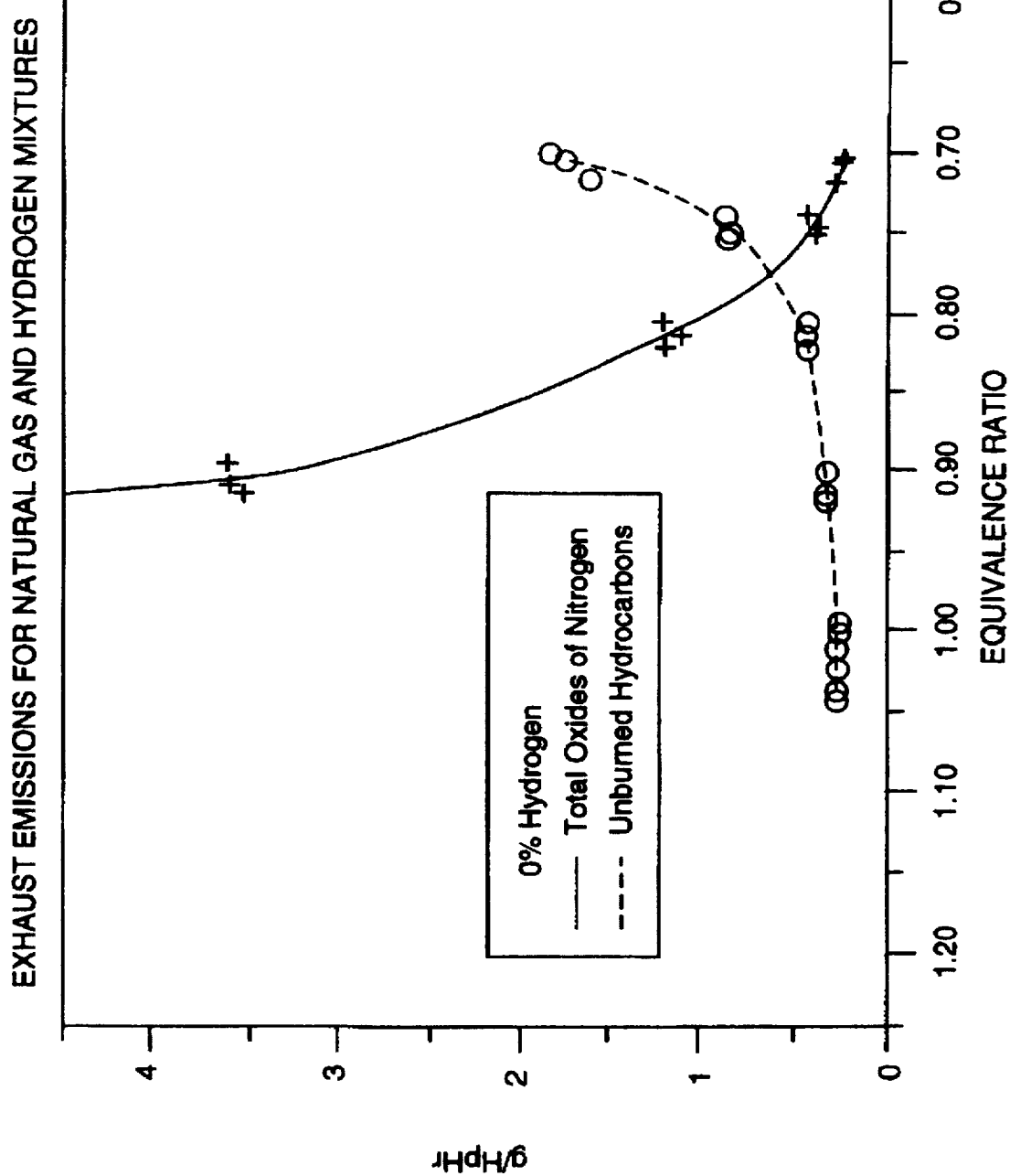
FIG. 3 shows a graph of exhaust emissions for natural gas and 0% hydrogen mixtures in grams per horse power hour(g/HpHr) vs. Equivalence ratio.
Figure 4:
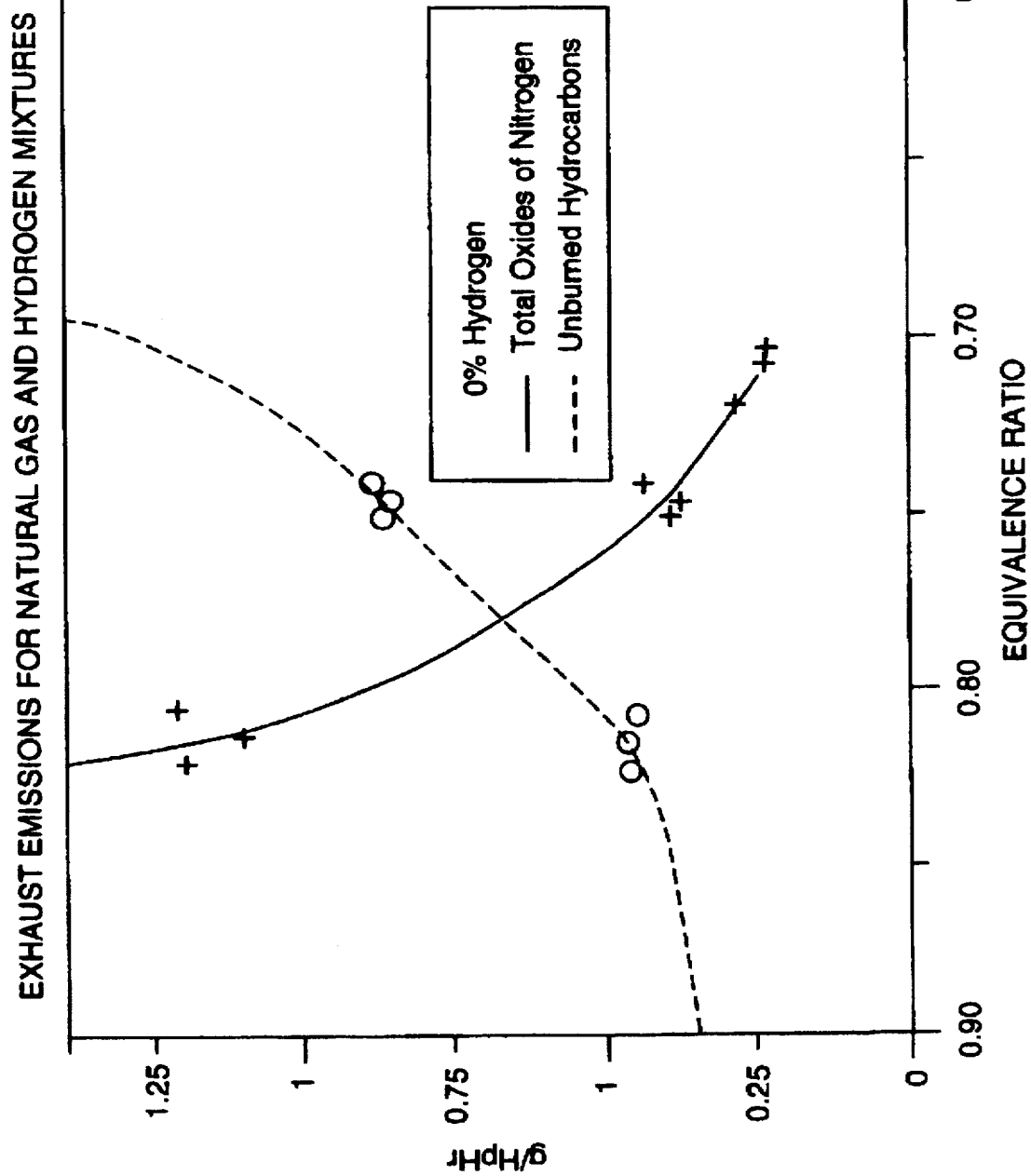
FIG. 4 shows an enlarged sectional graph of FIG. 3 of exhaust emissions for natural gas and 0% hydrogen mixtures in grams per horse power hour(g/HpHr) vs. Equivalence ratio.
Figure 5:
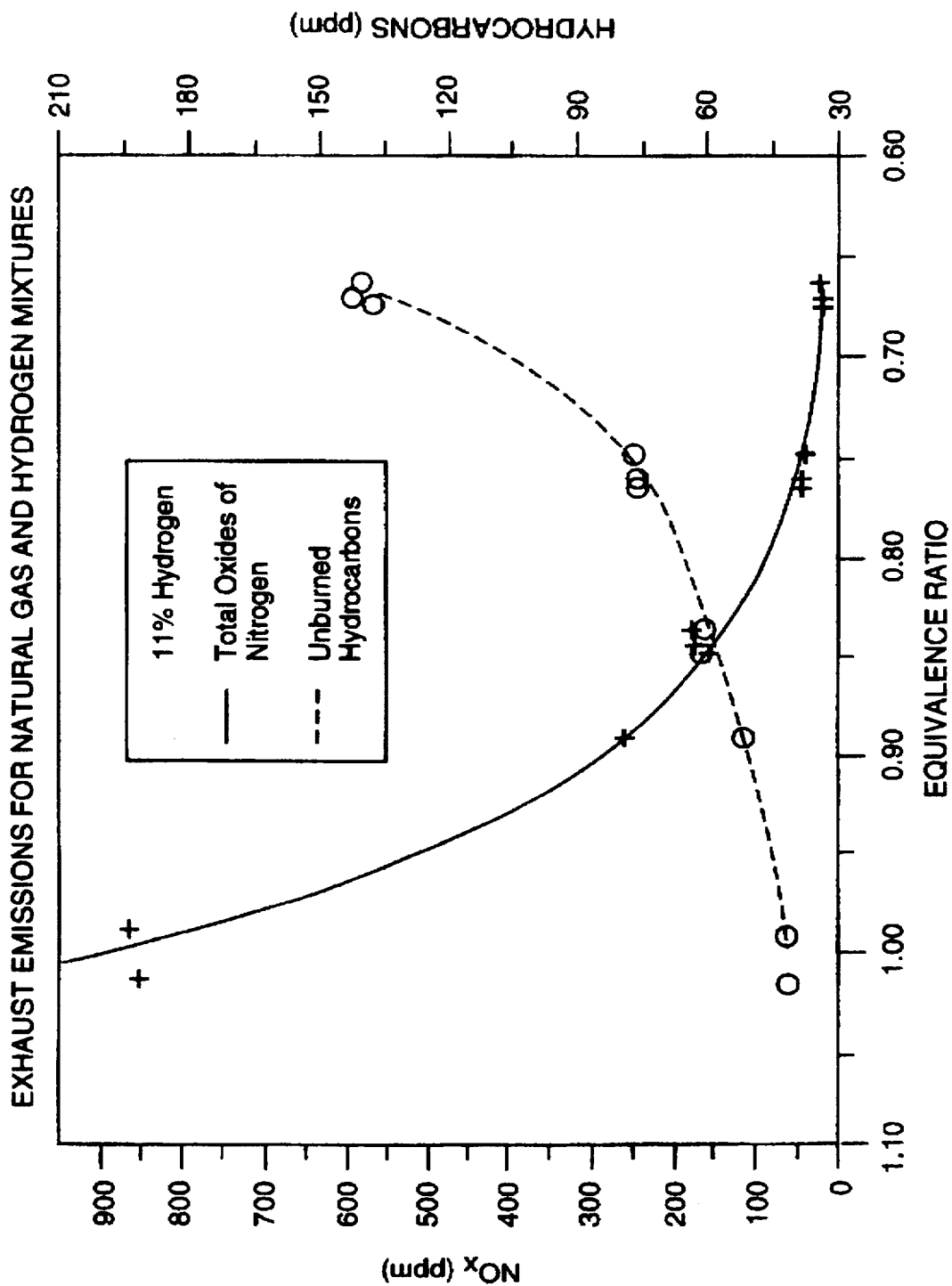
FIG. 5 shows a graph of exhaust emissions for natural gas and 11% hydrogen mixtures in parts per million(PPM) vs. Equivalence Ratio.
Figure 6:
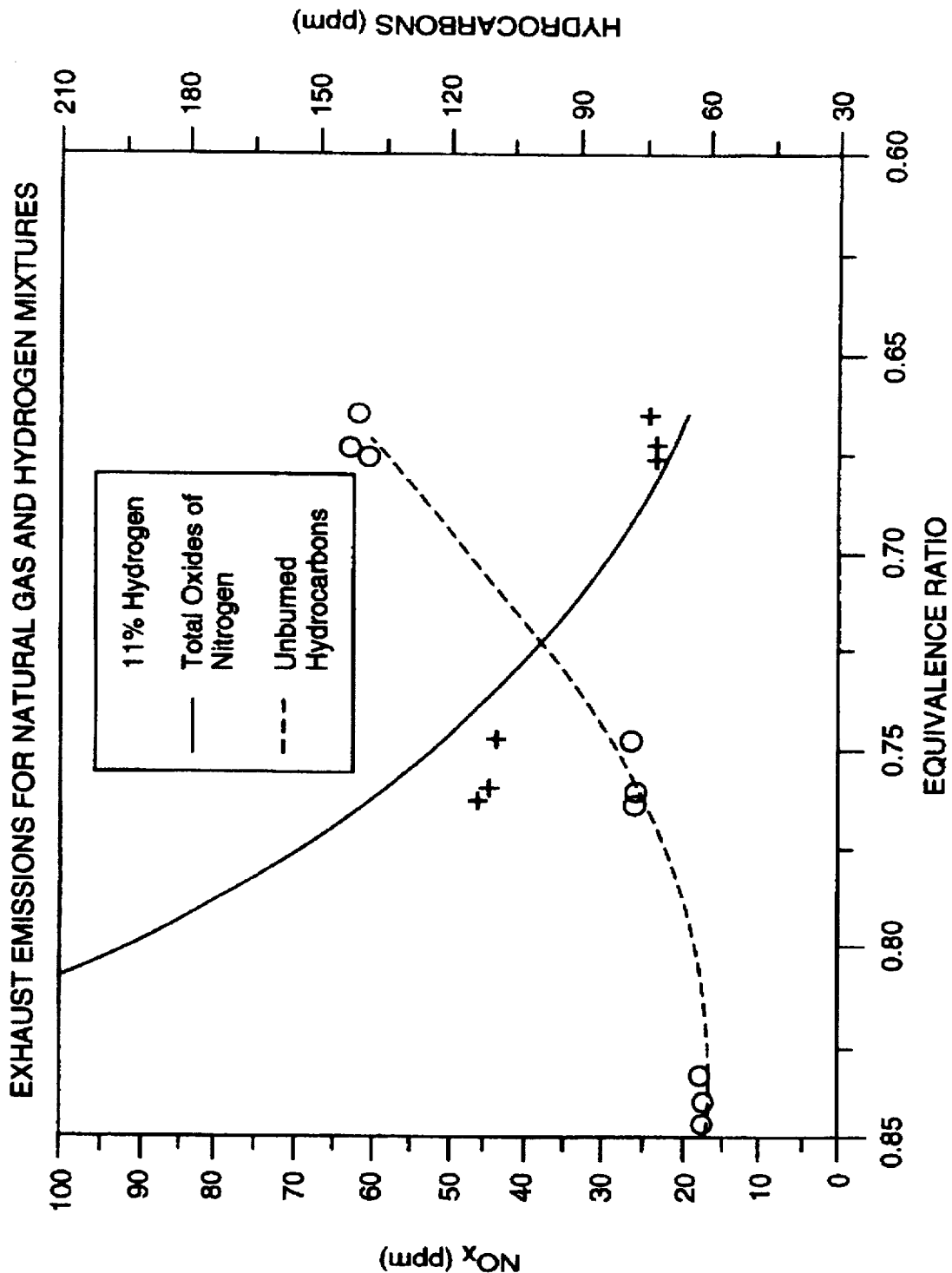
FIG. 6 shows an enlarged sectional graph of FIG. 5 of exhaust emissions for natural gas and 11% hydrogen mixtures in parts per million(PPM) vs. Equivalence Ratio.
Figure 7:
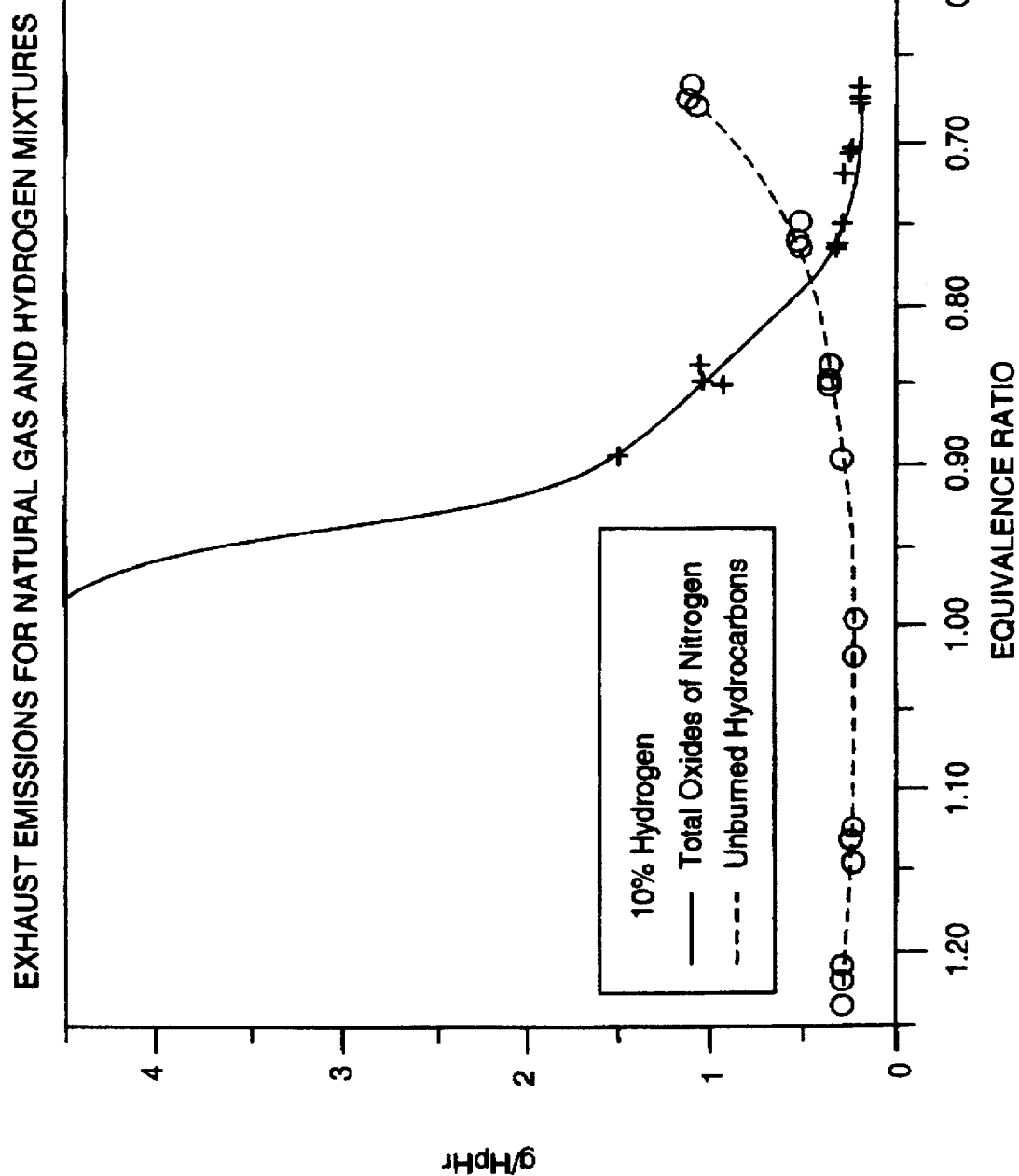
FIG. 7 shows a graph of exhaust emissions for natural gas and 10% hydrogen mixtures in grams per horse power hour(g/HpHr) vs. Equivalence ratio.
Figure 8:
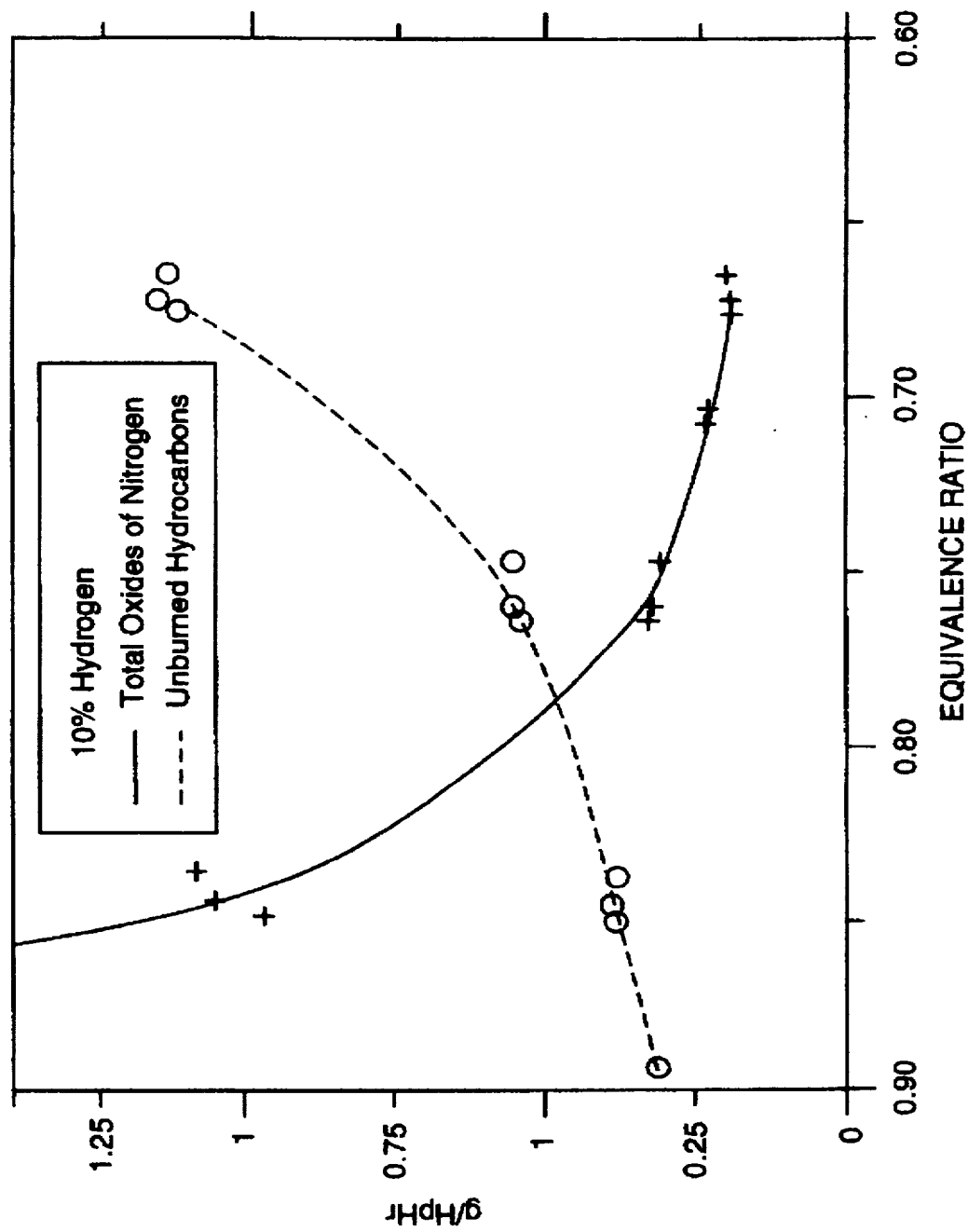
FIG. 8 shows an enlarged sectional graph of FIG. 7 of exhaust emissions for natural gas and 10% hydrogen mixtures in grams per horse power hour(g/HpHr) vs. Equivalence ratio.
Figure 9:
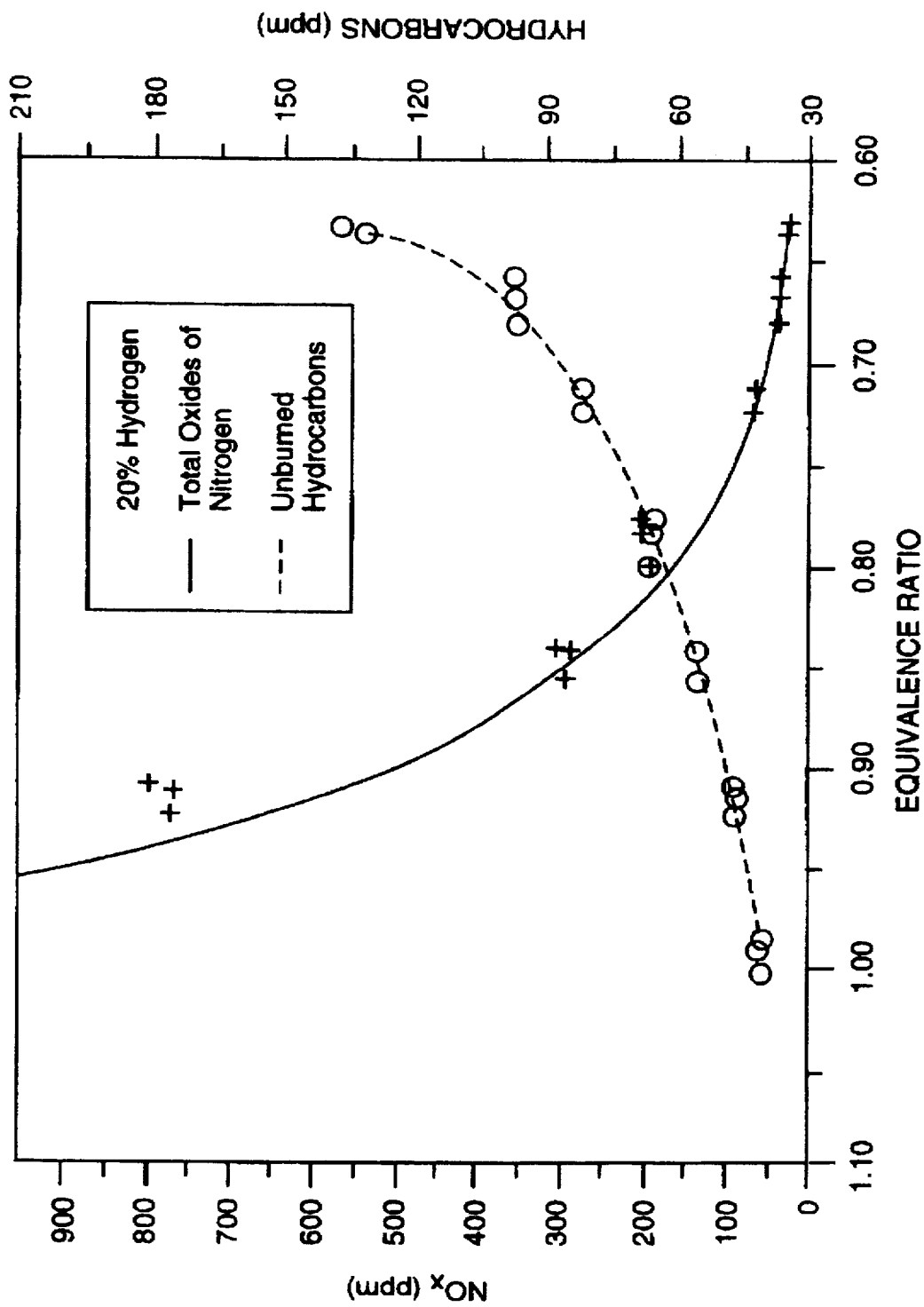
FIG. 9 shows a graph of exhaust emissions for natural gas and 20% hydrogen mixtures in parts per million(PPM) vs. Equivalence Ratio.
Figure 10:
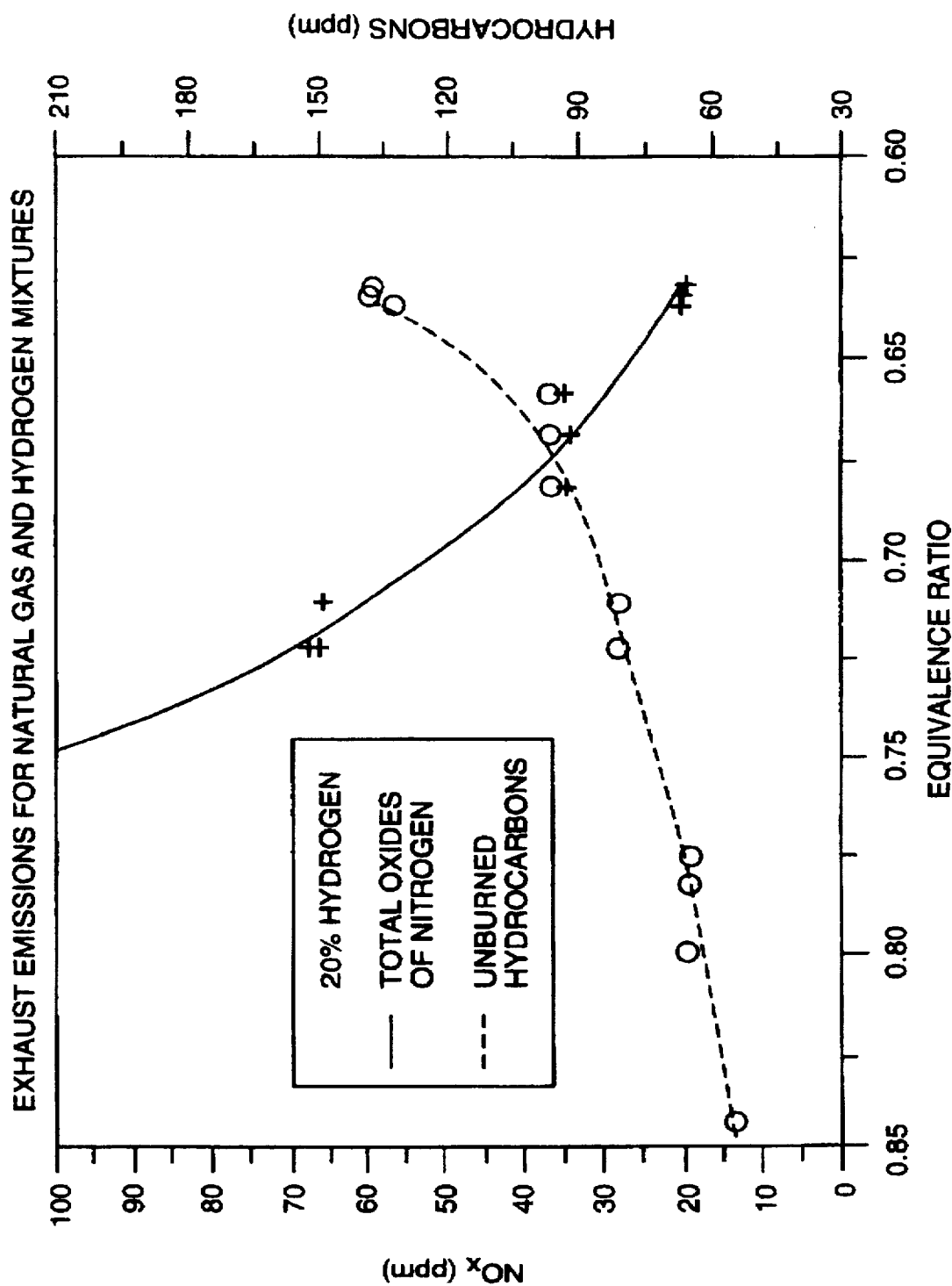
FIG. 10 shows an enlarged sectional graph of FIG. 9 of exhaust emissions for natural gas and 20% hydrogen mixtures in parts per million(PPM) vs. Equivalence Ratio.
Figure 11:
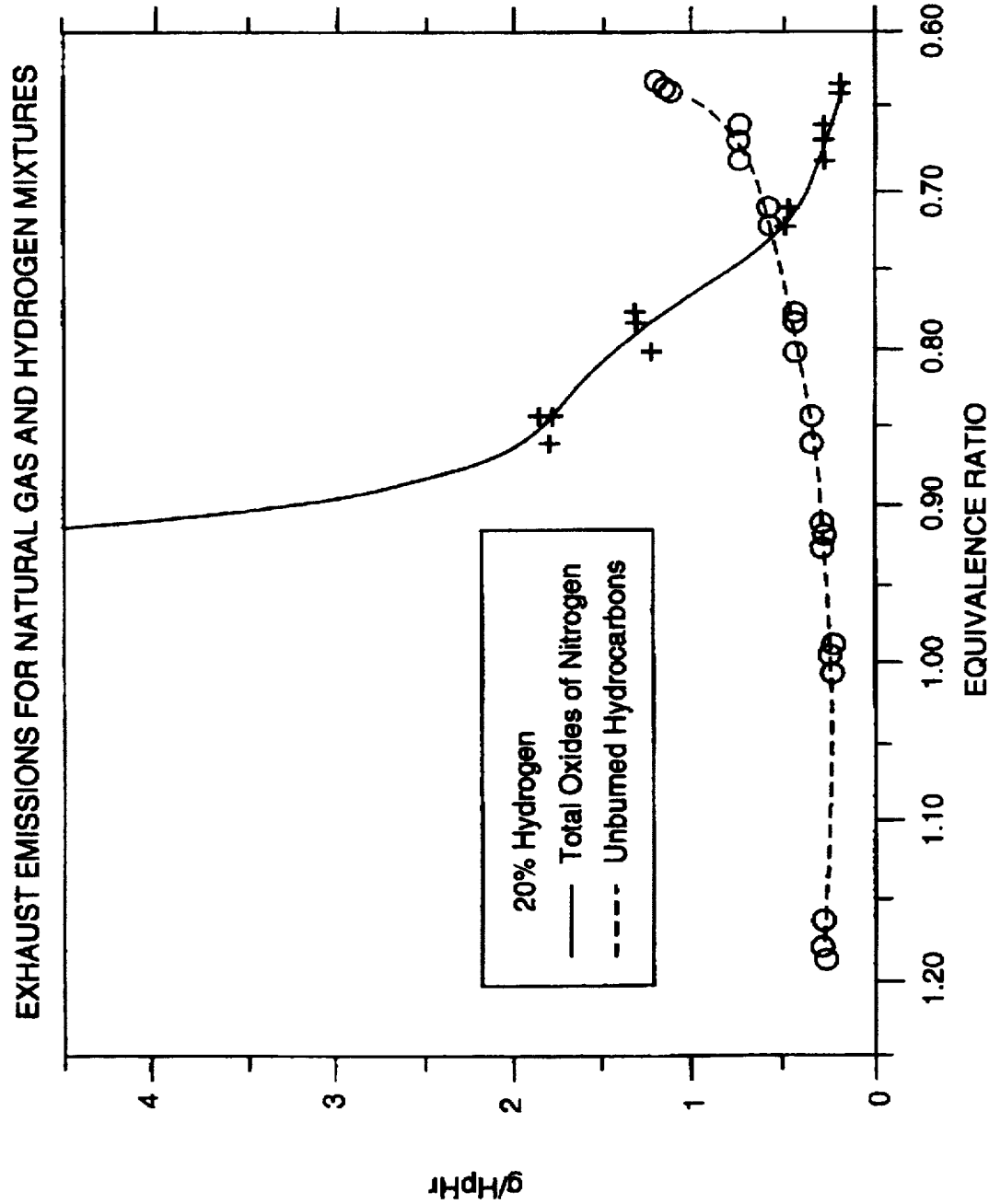
FIG. 11 shows a graph of exhaust emissions for natural gas and 20% hydrogen mixtures in grams per horse power hour(g/HpHr) vs. Equivalence ratio.
Figure 12:
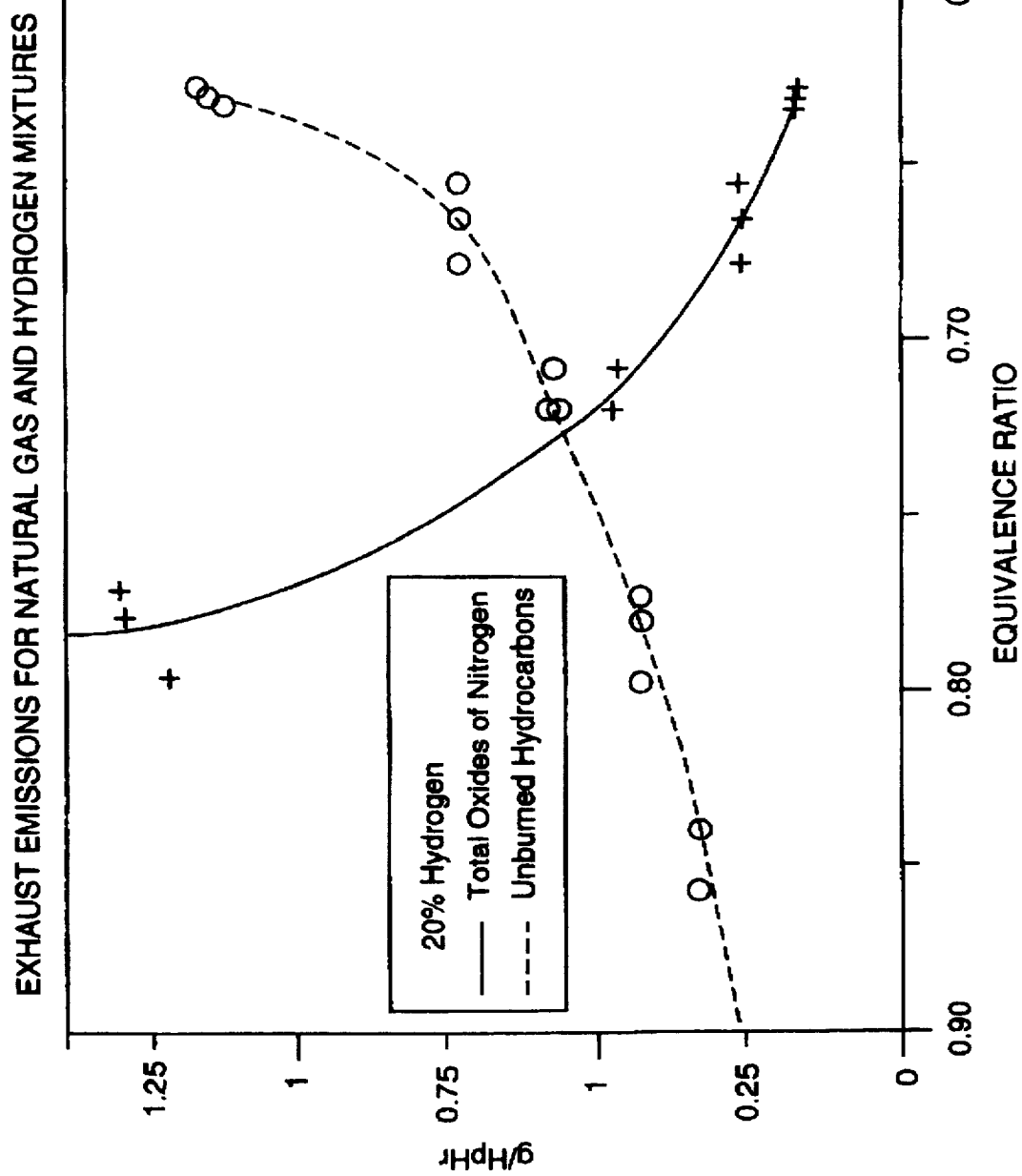
FIG. 12 shows an enlarged sectional graph of FIG. 11 of exhaust emissions for natural gas and 20% hydrogen mixtures in grams per horse power hour(g/HpHr) vs. Equivalence ratio.
Figure 13:
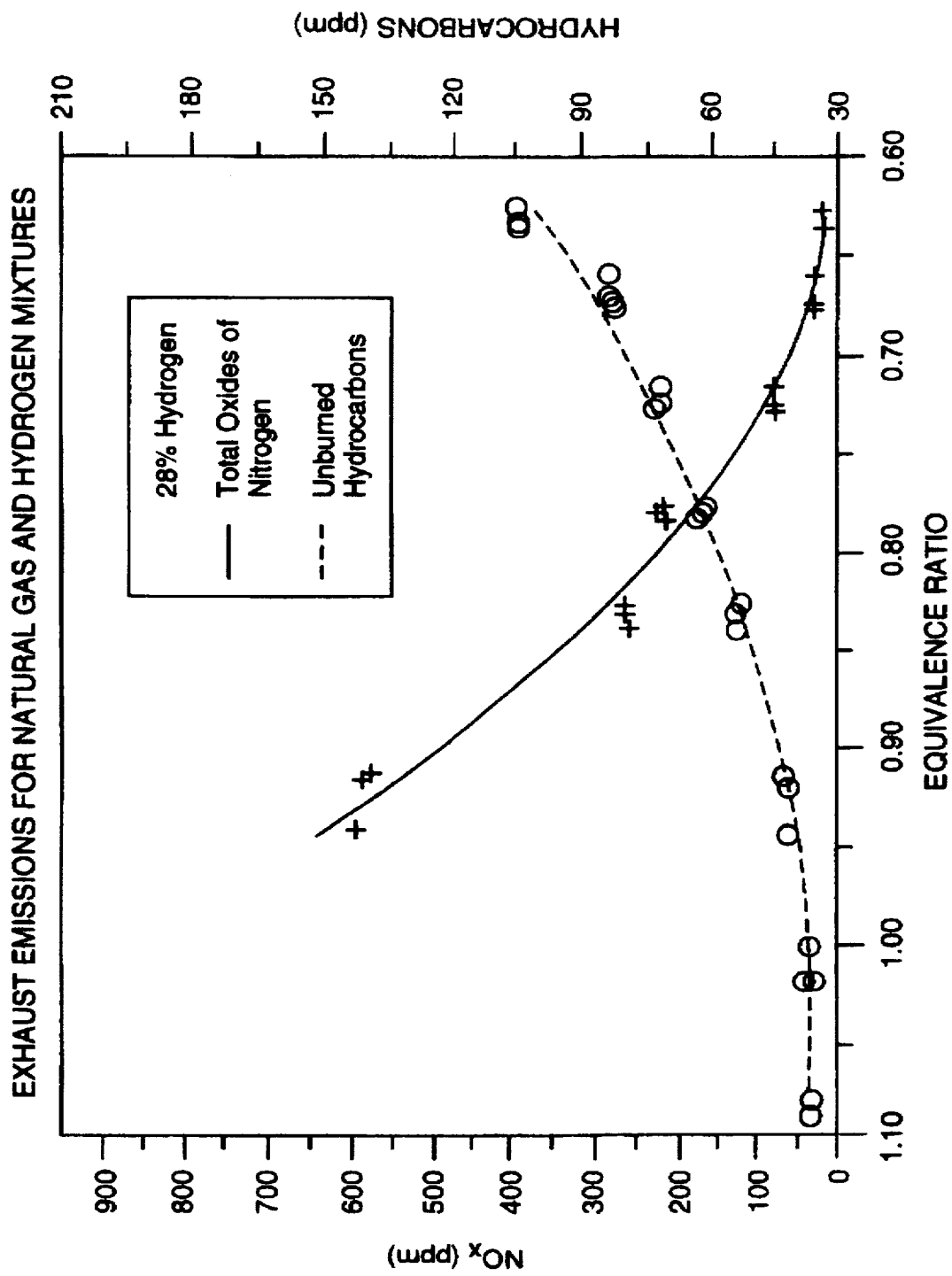
FIG. 13 shows a graph of exhaust emissions for natural gas and 28% hydrogen mixtures in parts per million(PPM) vs. Equivalence Ratio.
Figure 14:
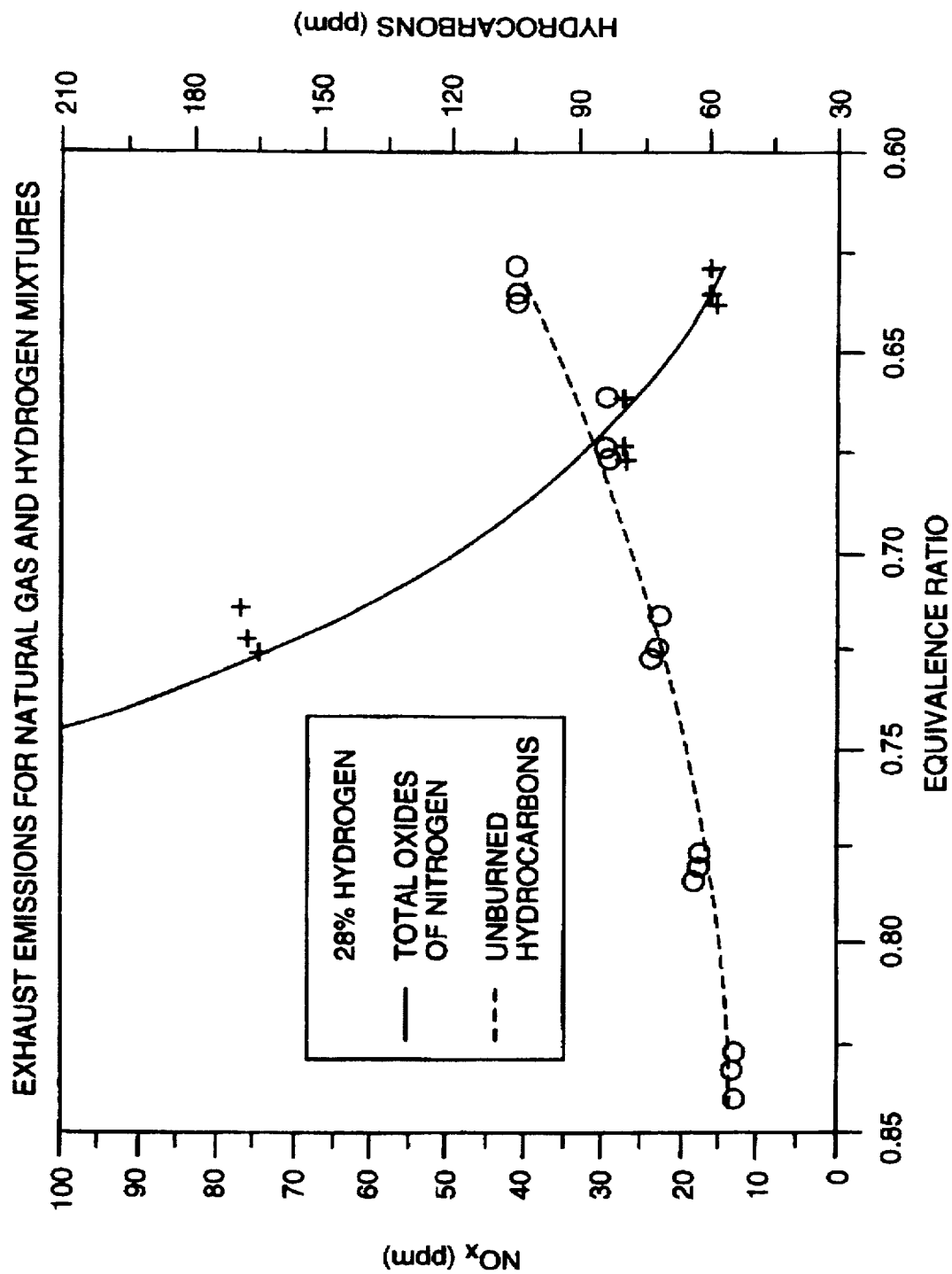
FIG. 14 shows an enlarged sectional graph of FIG. 13 of exhaust emissions for natural gas and 28% hydrogen mixtures in parts per million(PPM) vs. Equivalence Ratio.
Figure 15:
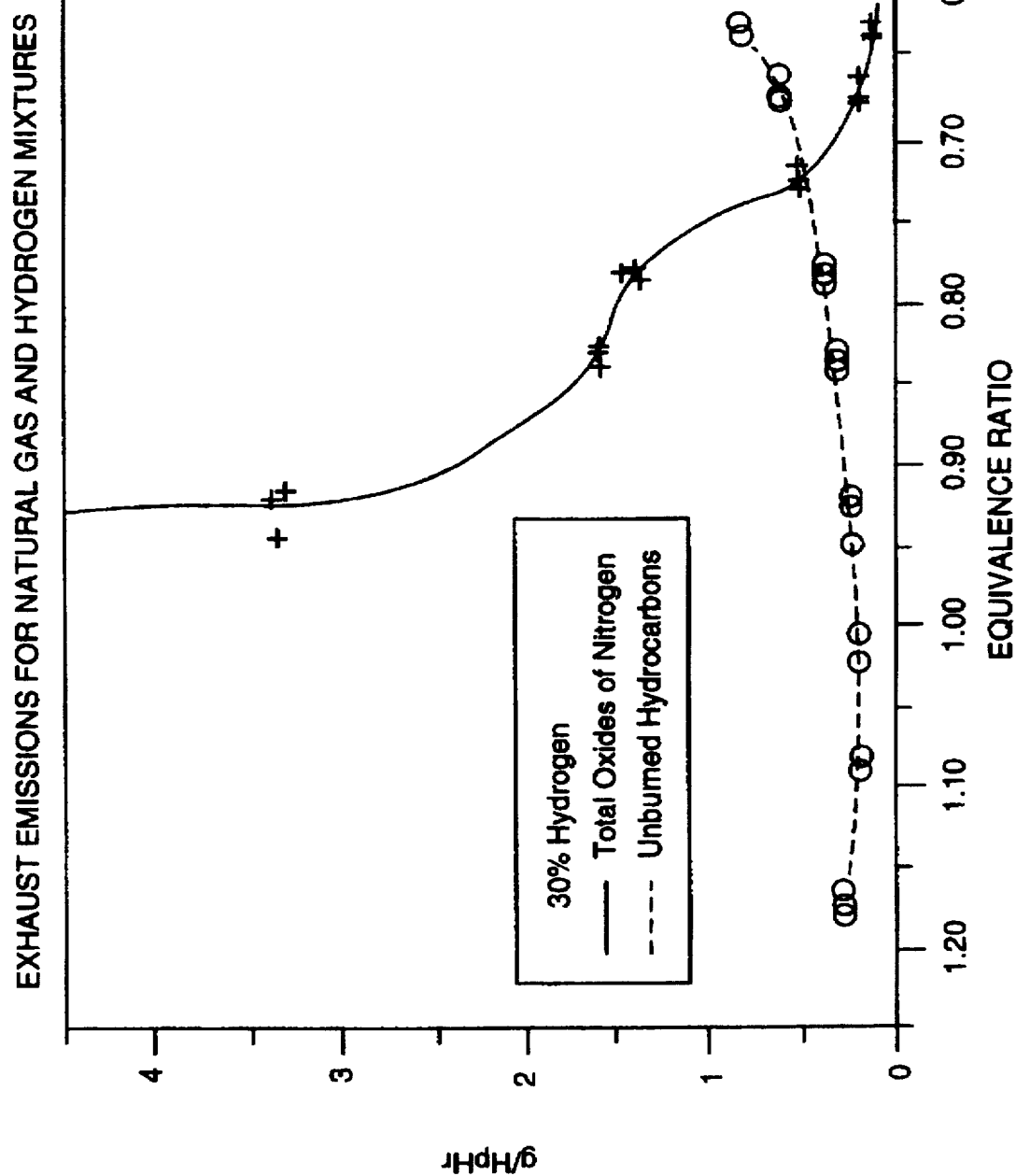
FIG. 15 shows a graph of exhaust emissions for natural gas and 30% hydrogen mixtures in grams per horse power hour(g/HpHr) vs. Equivalence ratio.
Figure 16:
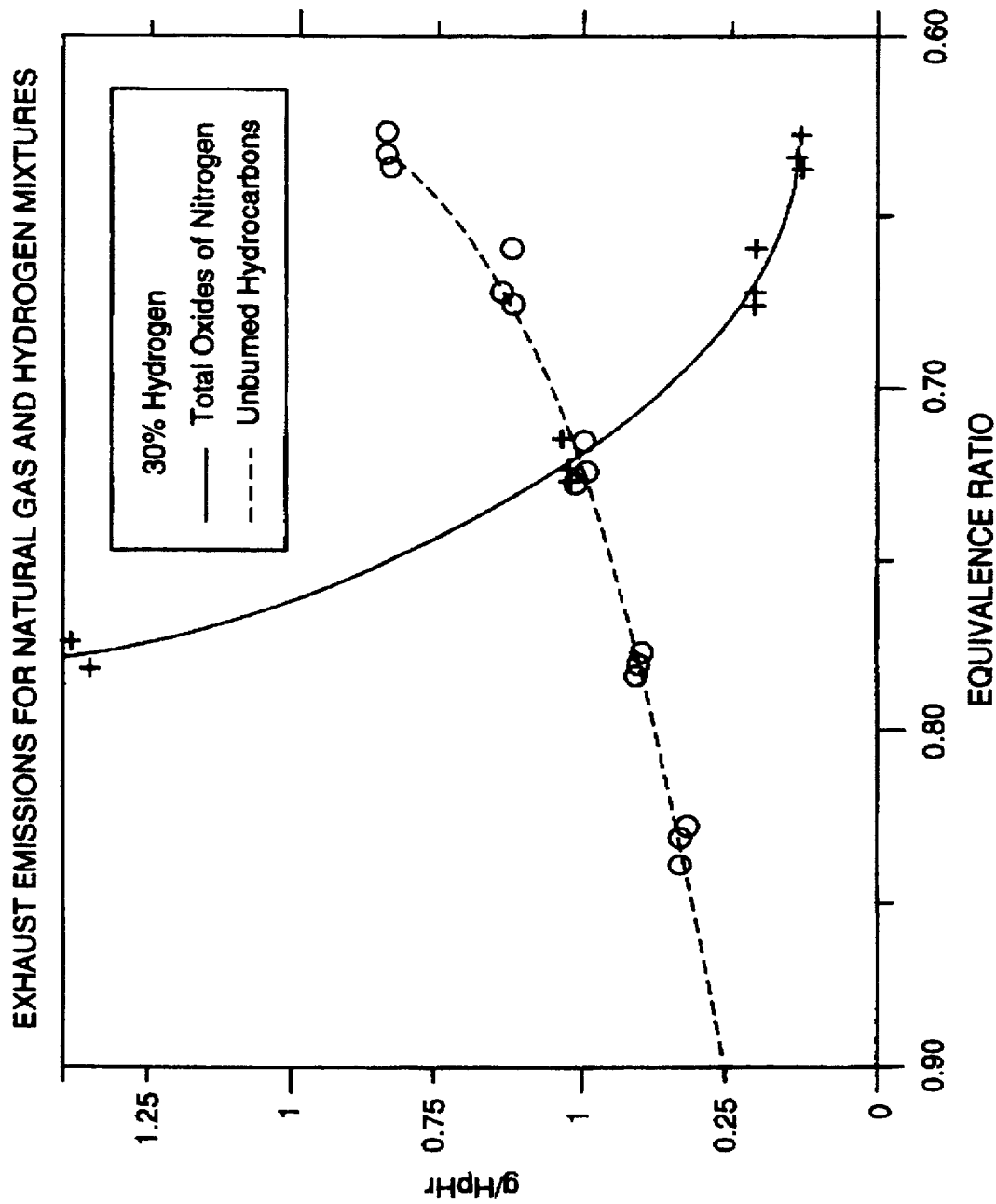
FIG. 16 shows an enlarged sectional graph of FIG. 15 of exhaust emissions for natural gas and 30% hydrogen mixtures in grams per horse power hour(g/HpHr) vs. Equivalence ratio.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

HYDROGEN ENRICHED NATURAL GAS FUELS

Tests were conducted with mixtures of hydrogen and natural gas. The fuels were mixed for the purpose of reducing emissions that are normally emitted by fossil fuels and to extend the lean combustion limit of natural gas by introducing hydrogen.

The engine used for these tests was a V-8, Chevrolet 350 which was rebuilt with the following specifications:

| | |
|---|---|
| Bore: | 4.030" (0.030 over bore from standard) |
| Stroke: | 3.480" |
| Pistons: | Cast Aluminum, Flat top with 4 valve reliefs |
| Cam: | Stock |
| Cylinder heads: | 76 cc |
| Valves: | Intake 1.94" |
| | Exhaust 1.50" |
| Compression Ratio: | 9:1 |
| Intake Manifold: | Aluminum Throttle Body |
| Exhaust Manifold: | 1⅝" Steel pipe headers |
| Spark Plugs: | Autolite: 303  Gap: 0.035" |
| Ignition: | HEI with the vacuum spark advance removed |
| Wires: | Carbon Core |
| Carburetor: | Throttle body with Impco Gaseous fuel meter |

The dynamometer used in the tests was a Computer Controlled Super Flow 901 with a maximum torque specification of 1000 lb ft. The dynamometer was calibrated prior to the beginning of testing. In addition, the dynamometer was checked for calibration drift due to the heating of the strain gage and was re-zeroed between each pull.

For the emissions monitoring a NOVA Model Number 7550/B was used to measure CO, $CO_2$, $O_2$, NO, $NO_2$, $NO_X$. The instrument was modified by FSEC to output the results to an Analog to Digital Board mounted in an IBM-compatible 286 computer. The NOVA was calibrated using certified span gases. The NOVA was zeroed using room air and was spanned using 35 ppm certified $NO_2$ span gas, 1402 ppm N-Hexane (Hydrocarbon), 8.993% Carbon Monoxide and 17.490% Carbon Dioxide. The hydrocarbons measured in this testing were not speciated to determine the exact makeup of the total. It is generally known that approximately 80 to 90% of the total hydrocarbons are made up of methane hydrocarbons. The methane hydrocarbons are non photo-reactive and are generally not considered to be a significant pollutant.

The $NO_2$ span gas bottle contained a liner to prevent any reaction between the gas and the bottle. The instrument was checked for zero drift before and after each test. In addition, the span was checked before and after each test sequence. Data was only accepted when both zero and span repeated within the limits of the instrumentation.

The emissions pickup tube was mounted in the collector pipe 14 inches from the primary pipes. Only stainless steel and Teflon tubing was used for exhaust gas delivery.

The following engine and atmospheric condition and monitoring equipment was utilized during testing and collected by the dynamometer: Oil Pressure, Exhaust Gas Temperature, Water Temperature, RPM, Torque, Barometric Pressure, Humidity, Carburetor Air Temp, Air, and Oil Temperature. The mass air flow was measured using a 6"calibrated turbine which was attached to the carburetor using a 6"sheet metal elbow. The exhaust gas temperature of each cylinder was monitored using a K type thermocouple mounted in an aluminum plate which was bolted between the head and the exhaust header. The thermocouples were mounted to take the exhaust temperature reading in the center of the exhaust stream.

For fuel flow, the mixture of CNG and hydrogen was fed into a Micro Motion Mass Flow Sensor, Model CMF 025. The Micro Motion Sensor operates using the coriolis effect, which negates the need for turbines and bearings thus substantially increasing the accuracy and repeatability of the gas flow measurements. The sensor was calibrated by Micro Motion and has a certified accuracy of 0.44% at a flow rate of 25 lbs per hour.

Each of the test runs were conducted at 17 horsepower and 1700 rpm. The testing was conducted at this level to simulate a light-duty truck traveling along a level paved road at 55 mph.

Each of the five tests included a varying mixture level volumes of hydrogen with natural gas. The results of tests 1-5 are listed in tables 1-5 respectively.

| TEST 1 0% HYDROGEN and 100% Natural Gas | | | | | | | | |
|---|---|---|---|---|---|---|---|---|
| TEST | A/F | FUEL % | EQUIV | CNG RPM | HP | MR | ETDC TIMING | TORQUE |
| AAA-2 | 16.5 | 0 | 1.0424 | 1697 | 17 | 22 | 50 | 52.7 |
| AAA-1 | 16.6 | 0 | 10.361 | 1695 | 17.1 | 23 | 50 | 53.1 |
| AAA-3 | 16.8 | 0 | 1.0238 | 1698 | 16.8 | 22 | 50 | 52.9 |
| AAB-2 | 17 | 0 | 1.0118 | 1698 | 17 | 22 | 49 | 52.5 |
| AAB-3 | 17.2 | 0 | 1 | 1698 | 17 | 22 | 49 | 52.5 |
| AAB-1 | 17.3 | 0 | 0.9942 | 1698 | 17 | 22 | 49 | 52.7 |
| AAC-2 | 18.7 | 0 | 0.9198 | 1700 | 1639 | 22 | 51 | 52.1 |
| AAC-3 | 18.8 | 0 | 0.9149 | 1699 | 17 | 22 | 51 | 52.5 |
| AAC-1 | 19.1 | 0 | 0.9005 | 1700 | 17 | 22 | 51 | 52.5 |
| AAD-1 | 20.9 | 0 | 0.823 | 1697 | 16.8 | 22 | 51 | 52 |
| AAD-3 | 21.1 | 0 | 0.8152 | 1694 | 17.7 | 23 | 51 | 53.4 |
| AAD-2 | 21.3 | 0 | 0.8075 | 1698 | 17.2 | 23 | 51 | 53.1 |
| AAE-2 | 22.9 | 0 | 0.7511 | 1699 | 17.1 | 22 | 56 | 52.9 |
| AAE-3 | 23 | 0 | 0.7478 | 1700 | 17.3 | 23 | 58 | 53.5 |
| AAE-1 | 23.2 | 0 | 0.7414 | 1692 | 16.8 | 22 | 56 | 52.3 |
| AAF-1 | 23.9 | 0 | 0.7197 | 1669 | 15.5 | 20 | 56 | 47.9 |
| AAF-2 | 24.3 | 0 | 0.7078 | 1704 | 16.12 | 21 | 56 | 49.5 |
| AAF-3 | 24.4 | 0 | 0.7049 | 1704 | 15.7 | 21 | 56 | 48.5 |
| | AVE | 0% | | | | | | |

| TEST | OIL TEMP | H2O TEMP | PPM NOX | PPM HC | PERCENT O2 | A1 + A2 SCFM | NOX g/Hp/Hr | HC g/Hp/Hr |
|---|---|---|---|---|---|---|---|---|
| AAA-2 | 201 | 172 | 999 | 49.2 | 2.88 | 41.6 | 5.40 | 0.27 |
| AAA-1 | 202 | 172 | 999 | 48.8 | 2.88 | 42 | 5.41 | 0.26 |
| AAA-3 | 203 | 173 | 999 | 48.9 | 2..93 | 41.6 | 5.46 | 0.27 |

TEST 1 0% HYDROGEN and 100% Natural Gas -continued

| | | | | | | | | |
|---|---|---|---|---|---|---|---|---|
| AAB-2 | 205 | 172 | 999 | 47.6 | 3.37 | 42.6 | 5.52 | 0.26 |
| AAB-3 | 206 | 171 | 999 | 46.8 | 3.38 | 42.4 | 5.49 | 0.26 |
| AAB-1 | 206 | 173 | 999 | 46.7 | 9.98 | 42.5 | 5.50 | 0.26 |
| AAC-2 | 206 | 172 | 56.2 | 5.2 | 46.1 | 3.54 | 0.34 | |
| AAC-3 | 205 | 173 | 603.8 | 58.7 | 5.19 | 46.3 | 3.60 | 0.34 |
| AAC-1 | 204 | 173 | 608.9 | 55.2 | 5.17 | 46.2 | 3.62 | 0.33 |
| AAD-1 | 204 | 172 | 182.3 | 69.5 | 6.64 | 50.5 | 1.20 | 0.46 |
| AAD-3 | 202 | 171 | 168.2 | 71.2 | 6.39 | 51.5 | 1.10 | 0.46 |
| AAD-2 | 203 | 172 | 183.5 | 68.4 | 6.64 | 51.9 | 1.21 | 0.45 |
| AAE-2 | 202 | 171 | 52.6 | 116.6 | 8.35 | 58.8 | 0.39 | 0.87 |
| AAE-3 | 202 | 172 | 115.5 | 8.34 | 59.2 | 0.38 | 0.86 | |
| AAE-1 | 203 | 171 | 56.9 | 115.8 | 8.32 | 59 | 0.43 | 0.88 |
| AAF-1 | 199 | 172 | 32.1 | 184.4 | 9.21 | 82.6 | 0.28 | 1.61 |
| AAF-2 | 200 | 171 | 209.1 | 9.34 | 63.4 | 0.24 | 1.76 | |
| AAF-3 | 199 | 171 | 26.4 | 211.4 | 9.33 | 83.2 | 0.23 | 1.84 |

In Table 1, at an equivalence ratio of 1 on the stoichiometric scale, the $NO_x$ was beyond the scale of the NOVA instrument. At an equivalence ratio of 0.8333 the $NO_x$ has fallen sharply, however, the hydrocarbons were beginning to rise sharply. This was an indication that the engine is at or near the lean limit of combustion. Although a continuous reduction in the equivalence ratio yielded a sharp reduction in $NO_x$ the engine misfired.

TEST 2 11% HYDROGEN AND 89% Natural Gas

| TEST | A/F | FUEL % | EQUIV | RPM | HP | MR | ETDC TIMING | TORQUE |
|---|---|---|---|---|---|---|---|---|
| ABA-2 | 14.2 | 10.7 | 1.2324 | 1700 | 17.0 | 22 | 35 | 52.7 |
| ABA-1 | 14.4 | 10.7 | 1.2153 | 1703 | 17 | 22 | 35 | 52.4 |
| ABA-3 | 14.5 | 10.7 | 1.2069 | 1896 | 17.1 | 23 | 35 | 53.1 |
| ABB-1 | 15.3 | 11.2 | 1.1438 | 1700 | 16.9 | 22 | 40 | 52.3 |
| ABB-2 | 15.5 | 11.3 | 1.129 | 1699 | 16.8 | 22 | 40 | 52 |
| ABB-3 | 15.6 | 11.5 | 1.1218 | 1699 | 17 | 22 | 40 | 52.4 |
| ABC-3 | 17.2 | 11.8 | 10.174 | 1700 | 17 | 22 | 40 | 52.4 |
| ABC-1 | 17.6 | 11.9 | 0.9943 | 1699 | 17.1 | 23 | 40 | 53 |
| ABC-2 | 17.6 | 11.8 | 0.9943 | 1700 | 17.1 | 22 | 40 | 52.7 |
| ABD-1 | 19.6 | 11.7 | 0.8929 | 1699 | 17.1 | 23 | 41 | 53 |
| ABD-2 | 19.6 | 11.6 | 0.8929 | 1697 | 17.1 | 22 | 41 | 52.9 |
| ABD-3 | 19.6 | 11.6 | 0.8929 | 1697 | 17.2 | 23 | 41 | 53.2 |
| ABE-2 | 20.6 | 11.6 | 0.8495 | 1701 | 17.2 | 23 | 44 | 53.1 |
| ABE-1 | 20.7 | 11.6 | 0.8454 | 1703 | 17.1 | 22 | 44 | 52.7 |
| ABE-3 | 20.9 | 11.6 | 0.8373 | 1700 | 17.1 | 22 | 44 | 52.7 |
| ABF-3 | 22.9 | 11.5 | 0.7642 | 1699 | 17.2 | 23 | 45 | 53.2 |
| ABF-1 | 23 | 11.5 | 0.7609 | 1701 | 16.9 | 22 | 45 | 52.1 |
| ABF-2 | 23.4 | 11.5 | 0.7479 | 1699 | 17.1 | 22 | 45 | 52.9 |
| ABG-2 | 25.9 | 11.5 | 0.6757 | 1701 | 17.1 | 22 | 55 | 52.7 |
| ABG-1 | 28 | 11.5 | 0.6731 | 1706 | 17.1 | 22 | 55 | 52.5 |
| ABG-3 | 26.3 | 11.5 | 0.6654 | 1706 | 17 | 22 | 55 | 52.3 |
| | AVE | 11.4% | | | | | | |

| TEST | OIL TEMP | H2O TEMP | PPM NOX | PPM HC | PERCENT O2 | A1 + A2 SCFM | NOX g/Hp/Hr | HC g/Hp/Hr |
|---|---|---|---|---|---|---|---|---|
| ABA-2 | 212 | 172 | 469.2 | 60.8 | 0.51 | 37.8 | 2.31 | 0.30 |
| ABA-1 | 211 | 172 | 454.9 | 61.1 | 0.5 | 38 | 2.26 | 0.3 |
| ABA-3 | 212 | 172 | 491.7 | 61.3 | 0.52 | 37.9 | 2.42 | 0.30 |
| ABB-1 | 212 | 174 | 999.5 | 49.4 | 1.28 | 38.1 | 5.00 | 0.25 |
| ABB-2 | 212 | 174 | 999.5 | 50.8 | 1.27 | 38.2 | 5.04 | 0.25 |
| ABB-3 | 213 | 174 | 999.5 | 48.7 | 1.31 | 38.3 | 4.99 | 0.24 |
| ABC-3 | 209 | 172 | 854.4 | 41.8 | 3.32 | 41.6 | 4.60 | 0.23 |
| ABC-1 | 209 | 174 | 867.2 | 41.6 | 3.41 | 41.8 | 4.66 | 0.22 |
| ABC-2 | 209 | 174 | 862.2 | 42.2 | 3.35 | 42.1 | 4.82 | 0.23 |
| ABD-1 | 208 | 173 | 254.6 | 52.1 | 5.48 | 46.6 | 1.52 | 0.31 |
| ABD-2 | 207 | 172 | 259.3 | 52.1 | 5.47 | 46 | 1.53 | 0.31 |
| ABD-3 | 207 | 171 | 259.4 | 51.9 | 5.48 | 46.5 | 1.53 | 0.31 |
| ABE-2 | 205 | 172 | 157.6 | 61.4 | 6.5 | 48.5 | 0.97 | 0.38 |
| ABE-1 | 207 | 171 | 168.8 | 61.5 | 6.44 | 48.8 | 10.5 | 0.38 |
| ABE-3 | 205 | 173 | 173.7 | 60.6 | 6.41 | 48.7 | 1.08 | 0.38 |
| ABF-3 | 203 | 171 | 46.1 | 76.1 | 8.02 | 55.3 | 0.32 | 0.53 |
| ABF-1 | 206 | 172 | 44.8 | 76.5 | 8.06 | 55.1 | 0.32 | 0.54 |
| ABF-2 | 205 | 171 | 43.4 | 77.2 | 8.05 | 55.5 | 0.31 | 0.54 |
| ABG-2 | 202 | 171 | 23.2 | 138.2 | 9.59 | 63.7 | 0.19 | 1.1 |

| TEST 2 11% HYDROGEN AND 89% Natural Gas |||||||| 
|---|---|---|---|---|---|---|---|
| ABG-1 | 204 | 171 | 23.4 | 142.6 | 9.65 | 63.9 | 0.19 | 1.15 |
| ABG-3 | 202 | 172 | 24.3 | 140.6 | 9.61 | 63.5 | 0.20 | 1.13 |

This test in Table 2 began at an equivalence ratio of 1.25. The $NO_x$ was approximately 450 ppm. The $NO_x$ climbed rapidly as the air to fuel mixture was leaned out. At an equivalence ratio of approximately 1.1 the $NO_x$ had risen beyond the instrument capability. At stoichiometric (an equivalence ratio of 1) the $NO_x$ is beginning to fall sharply and is reduced from that observed with no hydrogen added as this mixture is leaned out further, the $NO_x$ continues to fall significantly, and the hydrocarbons again began to rise sharply. However, the slope is less than that noted on pure natural gas.

Test 2 was terminated at an equivalence of 0.666. Although the engine did not appear to be at the lean limit, the hydrocarbons had risen beyond acceptable limits.

| TEST 3. 20% HYDROGEN AND 80% Natural Gas ||||||||
|---|---|---|---|---|---|---|---|
| TEST | A/F | FUEL % | EQUIV | RPM | HP | ME | BTDC TIMING | TORQUE |
| ACA-2 | 15 | 19.7 | 1.1833 | 1700 | 17 | 22 | 35 | 52.5 |
| ACA-1 | 15.1 | 19.5 | 1.1755 | 1702 | 17 | 22 | 35 | 52.4 |
| ACA-3 | 15.3 | 19.8 | 1.1601 | 1705 | 17 | 22 | 35 | 52.4 |
| ACB-2 | 17.7 | 19.8 | 1.0028 | 1699 | 17.2 | 23 | 39 | 53.2 |
| ACB-3 | 17.9 | 19.9 | 0.9916 | 1701 | 17.2 | 23 | 39 | 53 |
| ACB-1 | 18 | 19.8 | 0.9861 | 1698 | 17.3 | 23 | 39 | 53.4 |
| ACC-1 | 19.2 | 19.9 | 0.9245 | 1701 | 17 | 22 | 43 | 52.5 |
| ACC-3 | 19.4 | 20 | 0.9149 | 1700 | 17 | 22 | 43 | 52.4 |
| ACC-2 | 19.5 | 20 | 0.9103 | 1699 | 17 | 22 | 43 | 52.6 |
| ACD-2 | 20.7 | 19.9 | 0.8575 | 1696 | 17.1 | 22 | 45 | 52.9 |
| ACD-1 | 21.1 | 20 | 0.8412 | 1700 | 17.1 | 22 | 45 | 52.7 |
| ACD-3 | 21.1 | 20 | 0.8412 | 1699 | 17 | 22 | 45 | 52.4 |
| ACE-3 | 22.2 | 20 | 0.7995 | 1700 | 17 | 22 | 51 | 52.5 |
| ACE-2 | 22.7 | 20 | 0.7819 | 1699 | 17.1 | 23 | 51 | 53 |
| ACE-1 | 22.9 | 20 | 0.7751 | 1698 | 17 | 22 | 51 | 52.6 |
| ACF-2 | 24.8 | 20.1 | 0.7215 | 1697 | 17.1 | 22 | 55 | 52.9 |
| ACF-3 | 24.6 | 20 | 0.7215 | 1698 | 16.9 | 22 | 55 | 52.3 |
| ACF-1 | 25 | 20 | 0.71 | 1699 | 17 | 22 | 55 | 52.7 |
| ACG-2 | 26.1 | 20 | 0.6801 | 1699 | 17.1 | 22 | 59 | 52.9 |
| ACG-3 | 26.6 | 20 | 0.6673 | 1697 | 17 | 22 | 59 | 52.6 |
| ACG-I | 27 | 20 | 0.6574 | 1669 | 17 | 22 | 59 | 52.7 |
| ACH-1 | 27.9 | 20 | 0.6382 | 1700 | 16 | 21 | 60+ | 49.3 |
| ACH-2 | 28 | 20 | 0.6339 | 1709 | 16.5 | 22 | 60+ | 50.6 |
| ACH-3 | 28.1 | 20 | 0.8317 | 1703 | 16.2 | 21 | 60+ | 49.9 |
|  | AVE | 19.9% |  |  |  |  |  |  |

| TEST | OIL TEMP | H2O TEMP | PPM NOX | PPM HC | PERCENT O2 | A1 + A2 SCFM | NOX g/Hp/Hr | HC g/Hp/Hr |
|---|---|---|---|---|---|---|---|---|
| ACA-2 | 212 | 172 | 827.5 | 52.7 | 0.81 | 37.5 | 4.05 | 0.26 |
| ACA-1 | 219 | 174 | 824.7 | 54.9 | 0.83 | 37.5 | 4.04 | 0.27 |
| ACA-3 | 212 | 174 | 827.6 | 53.3 | 0.82 | 37.6 | 4.06 | 0.28 |
| ACB-2 | 210 | 172 | 999.5 | 41.1 | 3.81 | 42.1 | 5.38 | 0.22 |
| ACB-3 | 210 | 172 | 999.5 | 41.8 | 3.68 | 42 | 5.36 | 0.22 |
| ACB-1 | 212 | 172 | 999.5 | 41.1 | 3.63 | 42.3 | 5.37 | 0.22 |
| ACC-1 | 210 | 173 | 775.1 | 47.3 | 4.86 | 44.8 | 4.47 | 0.27 |
| ACC-3 | 209 | 173 | 773.3 | 46.6 | 4.89 | 44.3 | 4.41 | 0.27 |
| ACC-2 | 210 | 173 | 802.7 | 46.9 | 4.84 | 44.7 | 4.82 | 0.27 |
| ACD-2 | 206 | 173 | 292.5 | 55.6 | 6.19 | 47.3 | 1.77 | 0.34 |
| ACD-1 | 207 | 172 | 300.7 | 55.6 | 6.16 | 47.3 | 1.81 | 0.34 |
| ACD-3 | 206 | 172 | 288.5 | 55.6 | 6.16 | 47.3 | 1.75 | 0.34 |
| ACE-3 | 206 | 173 | 180.9 | 66.5 | 7.42 | 50.3 | 1.22 | 0.43 |
| ACE-2 | 205 | 172 | 200.2 | 65.8 | 7.35 | 51 | 1.30 | 0.43 |
| ACE-1 | 206 | 171 | 200.7 | 65.8 | 7.34 | 50.9 | 1.31 | 0.43 |
| ACF-2 | 204 | 170 | 67.9 | 81.1 | 8.63 | 55.1 | 0.47 | 0.57 |
| ACF-3 | 203 | 171 | 66.8 | 81.7 | 8.68 | 55.2 | 0.47 | 0.58 |
| ACF-1 | 204 | 172 | 66.1 | 80.9 | 8.63 | 55.5 | 0.47 | 0.57 |
| ACG-2 | 202 | 171 | 34.9 | 96.3 | 9.49 | 60.2 | 0.27 | 0.73 |
| ACG-3 | 202 | 171 | 34.3 | 96.7 | 9.49 | 50.7 | 0.26 | 0.73 |
| ACG-1 | 203 | 172 | 35.1 | 96.9 | 9.48 | 59.9 | 0.27 | 0.74 |
| ACH-1 | 200 | 171 | 20.7 | 132.3 | 10.15 | 63.2 | 0.18 | 1.13 |
| ACH-2 | 201 | 171 | 20.6 | 137.9 | 10.15 | 64 | 0.17 | 1.15 |
| ACH-3 | 200 | 172 | 19.9 | 137.2 | 10.19 | 64.3 | 0.17 | 1.17 |

In Test 3 at stoichiometric, the $NO_x$ is again beyond the limit of the measurement instrumentation. At an equivalence ratio of 0.95 (slightly lean) the $NO_x$ falls sharply. The $NO_x$ continues to fall as the equivalence ratio is reduced to a value of 0.625, where the test was terminated. The test was terminated because the engine again appeared to be missing and was apparently beyond the drivable limits.

| TEST 4. 28% HYDROGEN AND 72% Natural Gas | | | | | | | | |
|---|---|---|---|---|---|---|---|---|
| TEST | A/F | FUEL % | EQUIV | RPM | HP | ME | BTDC TIMING | TORQUE |
| ADA-3 | 15.3 | 28.1 | 1.1791 | 1701 | 16.8 | 22 | 36 | 52 |
| ADA-2 | 15.4 | 28.2 | 1.1714 | 1700 | 16.9 | 22 | 36 | 52.1 |
| ADA-1 | 15.5 | 28 | 1.1639 | 1703 | 16.8 | 22 | 36 | 51.9 |
| ADB-3 | 16.6 | 28.1 | 1.0887 | 1699 | 17 | 22 | 38 | 52.6 |
| ADB-1 | 16.7 | 28.1 | 1.0802 | 1702 | 17 | 22 | 38 | 52.4 |
| ADB-2 | 16.7 | 28.2 | 1.0802 | 1702 | 17 | 22 | 38 | 52.5 |
| ADC-1 | 17.7 | 28 | 1.0192 | 1702 | 17.2 | 23 | 39 | 53.1 |
| ADC-3 | 17.7 | 28.1 | 1.0192 | 1703 | 17.1 | 22 | 39 | 52.6 |
| ADC-2 | 18 | 28.2 | 1.0022 | 1699 | 17.3 | 23 | 39 | 53.4 |
| ADD-2 | 19.1 | 28.2 | 0.9445 | 1702 | 16.9 | 22 | 39 | 52.3 |
| ADD-1 | 19.6 | 28.3 | 0.9204 | 1702 | 16.8 | 22 | 39 | 52 |
| ADD-3 | 19.7 | 28.2 | 0.9157 | 1703 | 17 | 22 | 39 | 52.4 |
| ADE-3 | 21.5 | 28.3 | 0.8391 | 1701 | 17 | 22 | 41 | 52.6 |
| ADE-1 | 21.7 | 28.4 | 0.8313 | 1700 | 17 | 22 | 41 | 52.6 |
| ADE-2 | 21.8 | 28.4 | 0.8275 | 1703 | 17.2 | 23 | 41 | 53 |
| ADF-2 | 23 | 28.5 | 0.7843 | 1703 | 17.1 | 22 | 50 | 52.6 |
| ADF-3 | 23.1 | 28.4 | 0.781 | 1702 | 17 | 22 | 50 | 52.6 |
| ADF-1 | 23.2 | 28.4 | 0.7776 | 1703 | 17.1 | 22 | 50 | 52.6 |
| ADG-2 | 24.8 | 28.5 | 0.7274 | 1700 | 17 | 22 | 52 | 52.5 |
| ADG-3 | 24.9 | 28.5 | 0.7245 | 1701 | 17.1 | 22 | 52 | 52.6 |
| ADG-1 | 25.2 | 28.5 | 0.7159 | 1703 | 17 | 22 | 52 | 52.3 |
| ADH-3 | 26.7 | 28.5 | 0.6757 | 1701 | 17.1 | 22 | 54 | 52.7 |
| ADH-2 | 26.8 | 28.4 | 0.6731 | 1701 | 17 | 22 | 54 | 52.6 |
| ADH-1 | 27.3 | 28.5 | 0.6608 | 1703 | 17.2 | 23 | 54 | 53 |
| ADI-1 | 28.3 | 28.5 | 0.6375 | 1701 | 17 | 22 | 58 | 52.6 |
| ADI-3 | 28.4 | 28.5 | 0.6352 | 1698 | 16.8 | 22 | 58 | 52.4 |
| ADI-2 | 28.7 | 28.5 | 0.6286 | 1699 | 17 | 22 | 58 | 52.5 |
| | AVE | 28.3% | | | | | | |

| TEST | OIL TEMP | H2O TEMP | PPM NOX | PPM HC | PERCENT O2 | A1 + A2 SCFM | NOX g/Hp/Hr | HC g/Hp/Hr |
|---|---|---|---|---|---|---|---|---|
| ADA-3 | 209 | 173 | 999 | 52.3 | 0.9 | 38 | 5.01 | 0.26 |
| ADA-2 | 209 | 172 | 999 | 52.7 | 0.89 | 37.8 | 4.95 | 0.26 |
| ADA-1 | 210 | 173 | 999 | 54.6 | 0.88 | 37.8 | 4.96 | 0.27 |
| ADB-3 | 209 | 172 | 999 | 34.7 | 2.06 | 39 | 5.06 | 0.18 |
| ADB-1 | 210 | 173 | 999 | 34.8 | 2.01 | 39.3 | 5.09 | 0.18 |
| ADB-2 | 211 | 171 | 999 | 34.6 | 2.04 | 39.3 | 5.09 | 0.18 |
| ADC-1 | 209 | 172 | 999 | 35.2 | 3.58 | 41.7 | 5.33 | 0.19 |
| ADC-3 | 209 | 174 | 999 | 36.8 | 3.38 | 41.7 | 5.36 | 0.20 |
| ADC-2 | 207 | 174 | 999 | 35.7 | 3.36 | 41.9 | 5.32 | 0.19 |
| ADD-2 | 207 | 173 | 584.8 | 40.6 | 5 | 44 | 3.33 | 0.23 |
| ADD-1 | 208 | 173 | 580.8 | 40.7 | 5.01 | 44.4 | 3.36 | 0.24 |
| ADD-3 | 207 | 171 | 573.3 | 41.7 | 5 | 44.7 | 3.30 | 0.24 |
| ADE-3 | 204 | 172 | 252.6 | 53 | 6.54 | 48.6 | 1.57 | 0.33 |
| ADE-1 | 203 | 171 | 256.1 | 53.2 | 6.57 | 48.6 | 1.59 | 0.33 |
| ADE-2 | 205 | 171 | 253.1 | 52.3 | 6.55 | 48.5 | 1.58 | 0.32 |
| ADF-2 | 202 | 171 | 208.4 | 62.6 | 7.53 | 51.2 | 1.36 | 0.41 |
| ADF-3 | 203 | 172 | 220.6 | 61.6 | 7.53 | 51.4 | 1.45 | 0.40 |
| ADF-1 | 202 | 172 | 211.8 | 61.1 | 7.52 | 51.6 | 1.39 | 0.40 |
| ADG-2 | 202 | 171 | 74.1 | 72.4 | 8.59 | 55.1 | 0.52 | 0.51 |
| ADG-3 | 200 | 171 | 75.5 | 71.4 | 8.58 | 54.7 | 0.52 | 0.49 |
| ADG-1 | 201 | 171 | 76.4 | 71.1 | 8.56 | 54.9 | 0.53 | 0.50 |
| ADH-3 | 198 | 171 | 26.9 | 82.5 | 9.54 | 60 | 0.20 | 0.63 |
| ADH-2 | 200 | 172 | 27.3 | 83.1 | 9.54 | 60.1 | 0.21 | 0.63 |
| ADH-1 | 199 | 171 | 27.3 | 83.1 | 9.55 | 60 | 0.21 | 0.63 |
| ADI-1 | 198 | 170 | 15.9 | 104.1 | 10.27 | 63.6 | 0.13 | 0.84 |
| ADI-3 | 197 | 171 | 16.7 | 104.2 | 10.27 | 63.8 | 0.14 | 0.85 |
| ADI-2 | 199 | 171 | 16.5 | 104.4 | 10.27 | 63.8 | 0.13 | 0.84 |

In Test 4, at stoichiometric, the $NO_x$ is again beyond the limit of the measurement instrumentation and remained beyond the limit of instrumentation at an equivalence ratio of 0.95. When the air to fuel ratio was leaned to an equivalence of 0.87, the $NO_x$ dropped sharply. The test was again terminated at an equivalence ratio of approximately 0.625 where the $NO_x$ was measured to be approximately 16.5 ppm. The engine was again observed to be missing although in cylinder pressure readings were not taken to confirm this fact. Notice that the hydrocarbons were found to be 104 ppm.

| TEST 5 36% HYDROGEN AND 64% Natural Gas | | | | | | | |
|---|---|---|---|---|---|---|---|
| TEST | A/F | FUEL % | EQUIV | RPM | HP | MR | ETDC TIMING | TORQUE |
| AEA-1 | 16 | 35.9 | 1.1475 | 1704 | 16.9 | 22 | 35 | 52 |
| AEA-3 | 16 | 38 | 1.1475 | 1699 | 17.1 | 23 | 35 | 53 |
| AEA-2 | 16.1 | 36 | 1.1404 | 1704 | 16.6 | 22 | 35 | 51.3 |
| AEB-2 | 16.1 | 36 | 1.0144 | 1204 | 17 | 22 | 37 | 52.4 |
| AEB-1 | 18.5 | 36.1 | 0.9924 | 1701 | 17 | 22 | 37 | 52.4 |
| AEB-1 | 18.5 | 35.9 | 0.9871 | 1703 | 17 | 22 | 37 | 52.5 |
| AEC-3 | 20 | 36 | 0.918 | 1703 | 17 | 22 | 38 | 52.4 |
| AEC-1 | 20.3 | 35.9 | 0.9044 | 1706 | 16.9 | 22 | 38 | 52 |
| AEC-2 | 20.5 | 35.9 | 0.8958 | 1705 | 17.1 | 22 | 38 | 52.8 |
| AED-3 | 22 | 36 | 0.8345 | 1704 | 17 | 22 | 43 | 52.5 |
| AED-1 | 22.1 | 35.9 | 0.8303 | 1702 | 17 | 22 | 43 | 52.4 |
| AED-3 | 22.2 | 35.9 | 0.827 | 1703 | 17 | 22 | 43 | 52.4 |
| AEE-3 | 23.2 | 36 | 0.7914 | 1705 | 17 | 22 | 44 | 52.5 |
| AEE-2 | 23.3 | 36 | 0.788 | 1705 | 17.1 | 22 | 44 | 52.6 |
| AEE-1 | 23.4 | 35.9 | 0.7846 | 1702 | 17 | 22 | 44 | 52.6 |
| AEG-3 | 25 | 35.9 | 0.7344 | 1702 | 17 | 22 | 49 | 52.4 |
| AEG-2 | 25.2 | 36 | 0.7286 | 1703 | 17.1 | 22 | 49 | 52.6 |
| AEG-1 | 25.5 | 35.9 | 0.72 | 1702 | 17 | 22 | 49 | 52.5 |
| AEH-1 | 29.5 | 35.9 | 0.6224 | 1707 | 17 | 22 | 50 | 52.1 |
| AEH-2 | 29.5 | 35.9 | 0.6224 | 1704 | 16.8 | 22 | 50 | 51.9 |
| AEH-3 | 29.5 | 36 | 0.6224 | 1703 | 17.2 | 22 | 50 | 52.9 |
|  | AVE | 36.0% | | | | | | |

| TEST | OIL TEMP | H2O TEMP | PPM NOX | PPM HC | PERCENT O2 | A1 + A2 SCFM | NOX g/Hp/Hr | HC g/Hp/Hr |
|---|---|---|---|---|---|---|---|---|
| AEA-1 | 213 | 174 | 999 | 40.8 | 1.16 | 38 | 4.97 | 0.20 |
| AEA-3 | 213 | 173 | 999 | 41.1 | 1.13 | 38.3 | 4.95 | 0.20 |
| AEA-2 | 211 | 174 | 999 | 42.8 | 1.15 | 37.9 | 5.04 | 0.12 |
| AEB-2 | 207 | 174 | 999 | 32.8 | 3..71 | 41.9 | 5.41 | 0.16 |
| AEB-1 | 208 | 174 | 999 | 32.1 | 3.7 | 41.8 | 5.39 | 0.17 |
| AEB-3 | 207 | 173 | 999 | 33.1 | 3.71 | 42.1 | 5.43 | 0.18 |
| AEC-3 | 206 | 172 | 475.3 | 39.9 | 5.41 | 45.4 | 2.77 | 0.23 |
| AEC-1 | 206 | 173 | 493.3 | 39.5 | 5.39 | 45.5 | 2.90 | 0.23 |
| AEC-2 | 205 | 172 | 491.5 | 38.5 | 5.38 | 45.5 | 2.85 | 0.22 |
| AED-3 | 203 | 173 | 385.1 | 50.8 | 6.7 | 48.9 | 2.41 | 0.32 |
| AED-1 | 203 | 172 | 387.9 | 50.1 | 6.69 | 48.7 | 2.42 | 0.31 |
| AED-3 | 204 | 172 | 395.5 | 50.1 | 6.68 | 48.8 | 2.47 | 0.31 |
| AEE-3 | 201 | 171 | 204.1 | 58.4 | 7.53 | 51.1 | 1.33 | 0.38 |
| AEE-2 | 203 | 172 | 206.7 | 58.2 | 7..54 | 51.2 | 1.34 | 038 |
| AEE-1 | 203 | 173 | 202.6 | 58.4 | 7.58 | 51 | 1.32 | 0.38 |
| AEG-3 | 200 | 172 | 78.8 | 68 | 8.82 | 54.9 | 0.55 | 0.48 |
| AEG-2 | 200 | 170 | 77.7 | 67.4 | 8.62 | 54.8 | 0.54 | 0.47 |
| AEG-1 | 202 | 172 | 76.9 | 68.4 | 8.85 | 54.9 | 0.54 | 0.48 |
| AEH-1 | 199 | 170 | 12.4 | 105.5 | 10.63 | 64.8 | 0.10 | 0.87 |
| AEH-2 | 198 | 172 | 11.7 | 104.1 | 10.64 | 65 | 0.10 | 0.87 |
| AEH-3 | 199 | 172 | 11.9 | 102.7 | 10.6 | 64.9 | 0.10 | 0.83 |

In Test 5 at stoichiometric, the $NO_x$, levels were beyond the measurement limit of the instrumentation. The $NO_x$ levels dropped sharply at an equivalence ratio of 0.91. The $NO_x$ levels continue to fall to the termination of the test at approximately 0.625 equivalence ratio. The $NO_x$ has a low value of approximately 12 ppm. The hydrocarbons have a maximum value of 105 ppm. This is approximately the same as the hydrocarbons measured during the 30% hydrogen testing. The test was terminated before there was a sharp rise in the hydrocarbons thus indicating that the roughness was not being caused by running the engine beyond the lean limit.

SUMMARY OF TESTS 1-5

The purpose of TESTS 1 through 5 was to determine if the lean limit of Natural Gas can be extended by introducing Hydrogen, $H_2$. The hypothesis used was that the leaner the engine could be run without going into lean misfire, the lower the $NO_x$ would be while only incurring moderate increases in the Hydro Carbons, HCs. HCs were not considered to be a significant problem since HCs can be reduced using catalysts.

FIGS. 1 through 20 show partial maps of the $NO_x$ and hydrocarbon emissions at various levels of hydrogen in Natural Gas and at various equivalence ratios.

Both 28% hydrogen and 36% hydrogen mixtures yielded very low $NO_x$ levels a to 0.625 equivalence ratio. See FIGS. 13-20. The extremely low $NO_x$ levels of 28 ppm (0.21 gm/hp hr) and 12 ppm( (0.10 gm/hp hr) respectively were unexpected. Recall that all of the emissions readings were taken at the exhaust manifold outlet. There were no emission control equipment on the tested engine and there was no catalytic converter. The levels of $NO_x$ at 28% and 36% hydrogen mixtures were substantially below the strictest air quality standards. For example, current air quality standards in Japan require $NO_x$ emissions to be below 200 ppm. This standard is extremely difficult to meet and has never been met without substantial emissions control equipment on the engine, based on the prior art known to the inventors.

Figure 17:
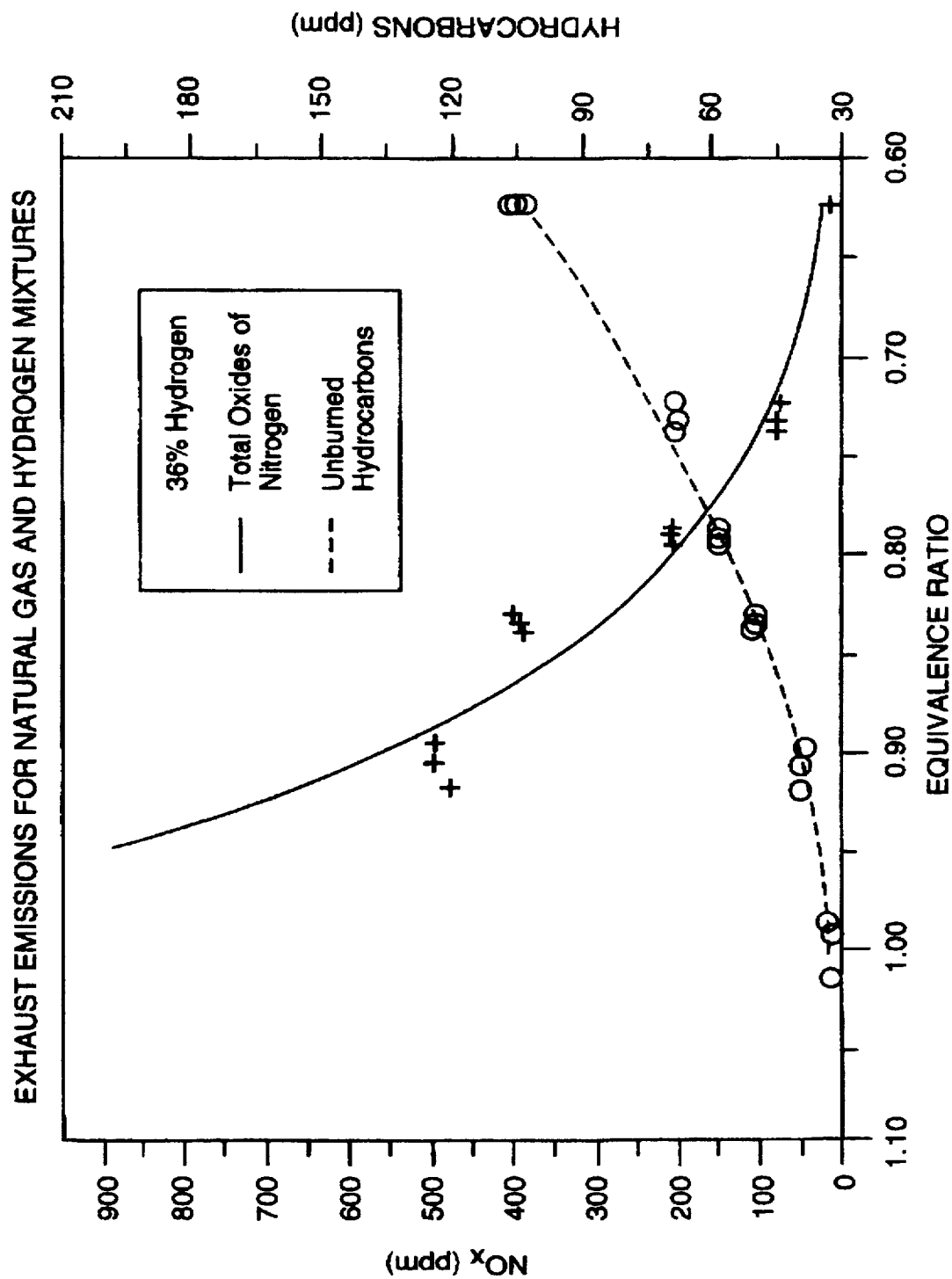
FIG. 17 shows a graph of exhaust emissions for natural gas and 36% hydrogen mixtures in parts per million(PPM) vs. Equivalence Ratio.
Figure 18:
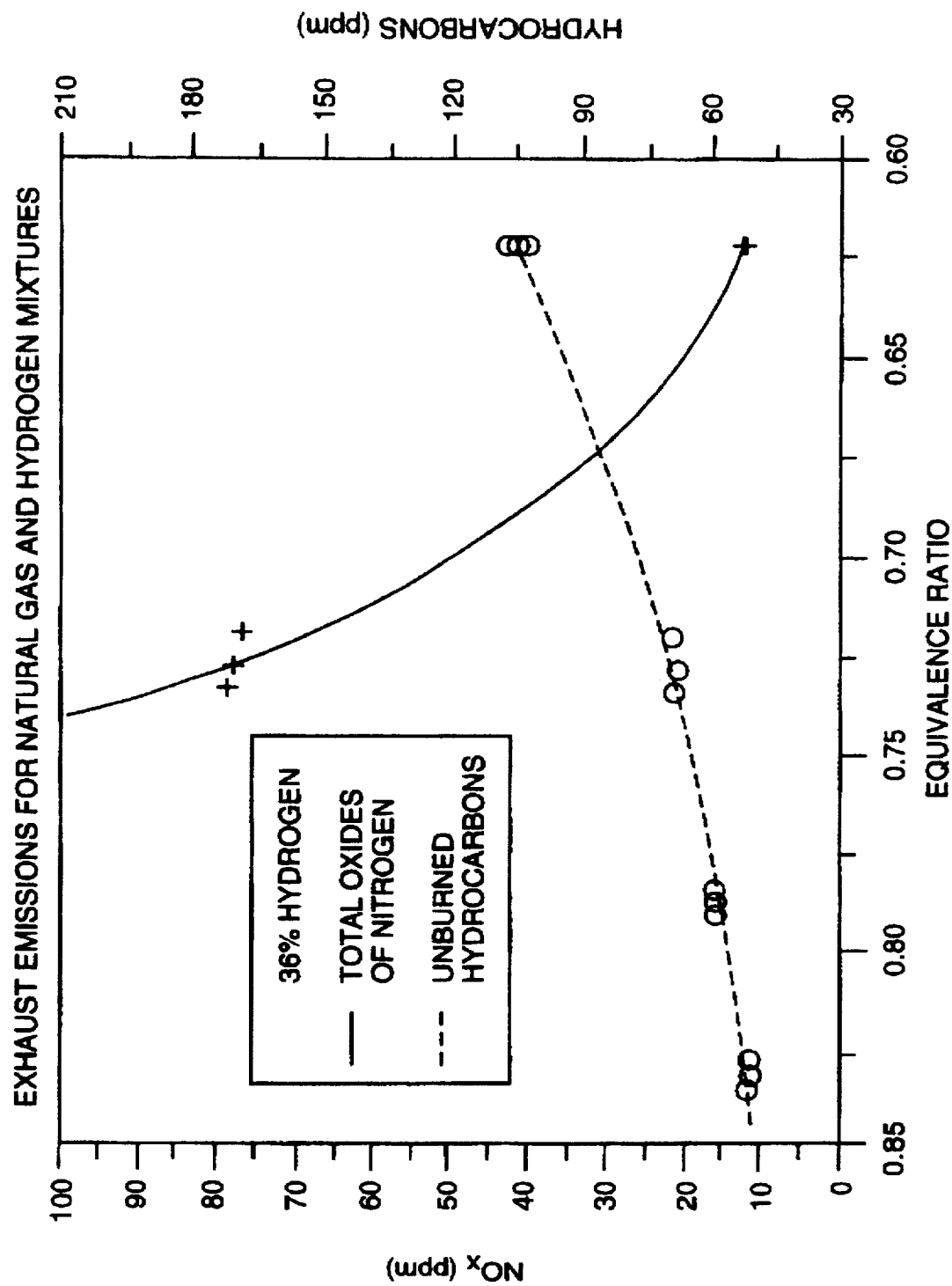
FIG. 18 shows an enlarged sectional graph of FIG. 17 of exhaust emissions for natural gas and 36% hydrogen mixtures in parts per million(PPM) vs. Equivalence Ratio.

Referring back to FIGS. 2 and 4 for 0% Hydrogen. Although at an equivalence ratio of 0.75 the $NO_x$ level fell significantly the hydrocarbons increased at approximately the same rate thus indicating an unstable operating condition. This same result can be noted in FIGS. 6 and 8 (11% Hydrogen) and in FIGS. 10 and 12 (20% Hydrogen). However, the lean limit extends from approximately 0.75 equivalence ratio at 0% hydrogen to 0.67 equivalence ratio at 20% hydrogen. It is not feasible to operate the engine at these lean limits since a very small change in the air fuel ratio will make a very significant increase in the $NO_x$ levels or a very significant increase in the hydrocarbon levels. When the hydrogen concentration was extended to 28% there is no longer a point where the hydrocarbons abruptly increase as was seen at all lower levels of hydrogen thus making lean burn a viable option. This same result was noted at concentrations of 36% hydrogen as seen in FIGS. 17 and 18.

The test results demonstrate that extremely low levels of $NO_x$ are possible with acceptably moderate increases in unburned hydrocarbons using 28 % and 36% hydrogen supplementation. Previous research conducted at 20% hydrogen did not indicate a significant enough reduction to consider the mixture of hydrogen and natural gas as a viable solution to the problem of producing extremely low $NO_x$ levels of 20% and below. The significant reduction in $NO_x$ was realized when the hydrogen level was raised to approximately 30% and the engine was run nearer the lean limit. In addition, the lean limit of combustion was significantly extended by the increased levels of hydrogen. The $NO_x$ levels reported are an order of magnitude below the strictest current requirements. This level of $NO_x$ was achieved without a catalytic converter or other emissions reducing hardware on the engine.

The tests and related data demonstrate that levels up to approximately 50% Hydrogen can be used with combustion engines. Over 50% Hydrogen gas in the mixture could create possible problems related to storage and safety. However, the specific mixture amounts of between approximately 21 and 50% Hydrogen, can be further narrowed down by engine size(4,6,8 cylinders) and regulatory concerns.

While natural gas has been referred to as including primarily methane, natural gas can include other components is much smaller amounts. Besides primarily containing methane, natural gas can include Carbon Dioxide. Nitrogen, Ethane, Propane, Iso-Butane, N-Butane, Iso Pentane, N-Pentane, and Hexanes Plus.

While the tested engine did not use a catalytic converter, one could be added. The hydrocarbon levels at 28% and 36% hydrogen at an equivalence ratio of 0.625 were both approximately 104 ppm(0.84 gm/hp hr). Since approximately 15% of the hydrocarbons are photo reactive the total reactive hydrocarbons are approximately 16 ppm (0.13 gm/hp hr.). This level of hydrocarbon emissions is extremely low and there is the potential of reducing the total hydrocarbons to near zero through the use of a catalytic converter.

Mixtures of hydrogen and natural gas can be mixed by known methods such as but not limited to sonic mixing, or merely injecting hydrogen into natural gas, or injecting natural gas into hydrogen.

While the alternative fuel mixture in this invention has been successfully used with existing combustion engines, modifications on existing engines can be accomplished in order to enhance engine performance such as horsepower. For example, the alternative fuel disclosed herein can be used in combustion engines include but are not limited to turbocharging, engine settings(ignition, sparkplugs), camshafts, intake manifold and cylinder head modifications, compression ratios, and injection system and combinations thereof.

While the invention has been described as being used for mobile vehicles such as an eight(8) cylinder automobiles, the invention would have applicability to various other size engines such as four(4), six(6), and twelve(12) cylinder mobile engines.

Furthermore, the disclosed invention can be used with other size engines such as but not limited to lawnmower engines, trucks, vans, aircraft and trains.

VARIABLE AIR/FUEL RATIO THROTTLE CONTROL

Figure 21A:
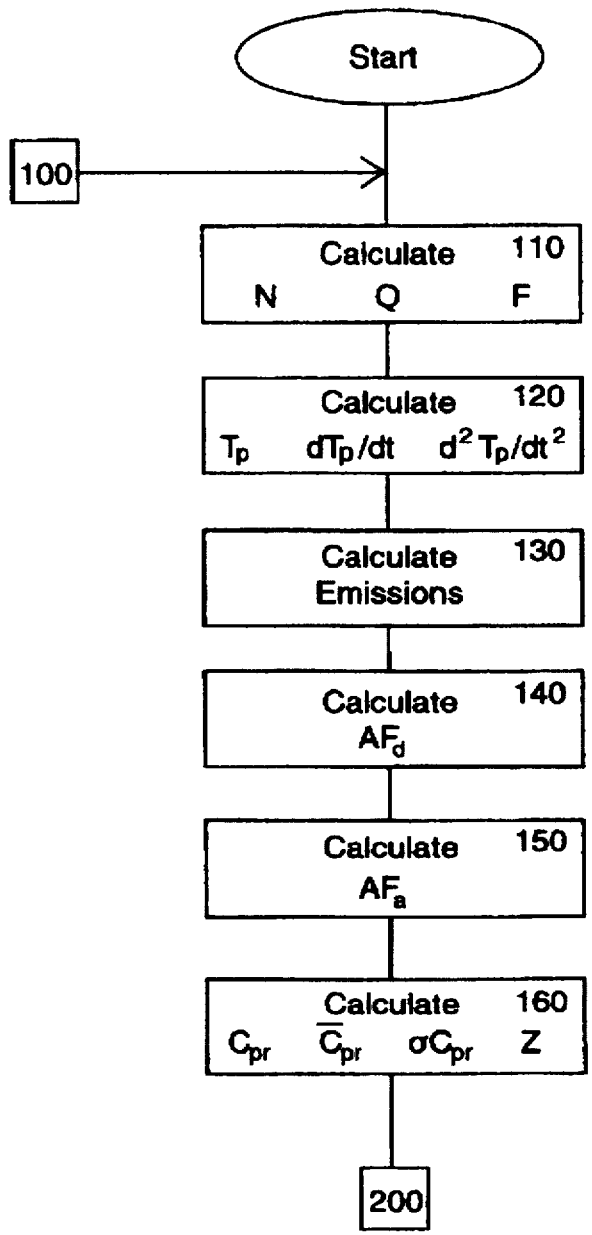
FIG. 21A and 21B is a Flow chart showing a preferred operation of the throttle control invention.
Figure 21B:
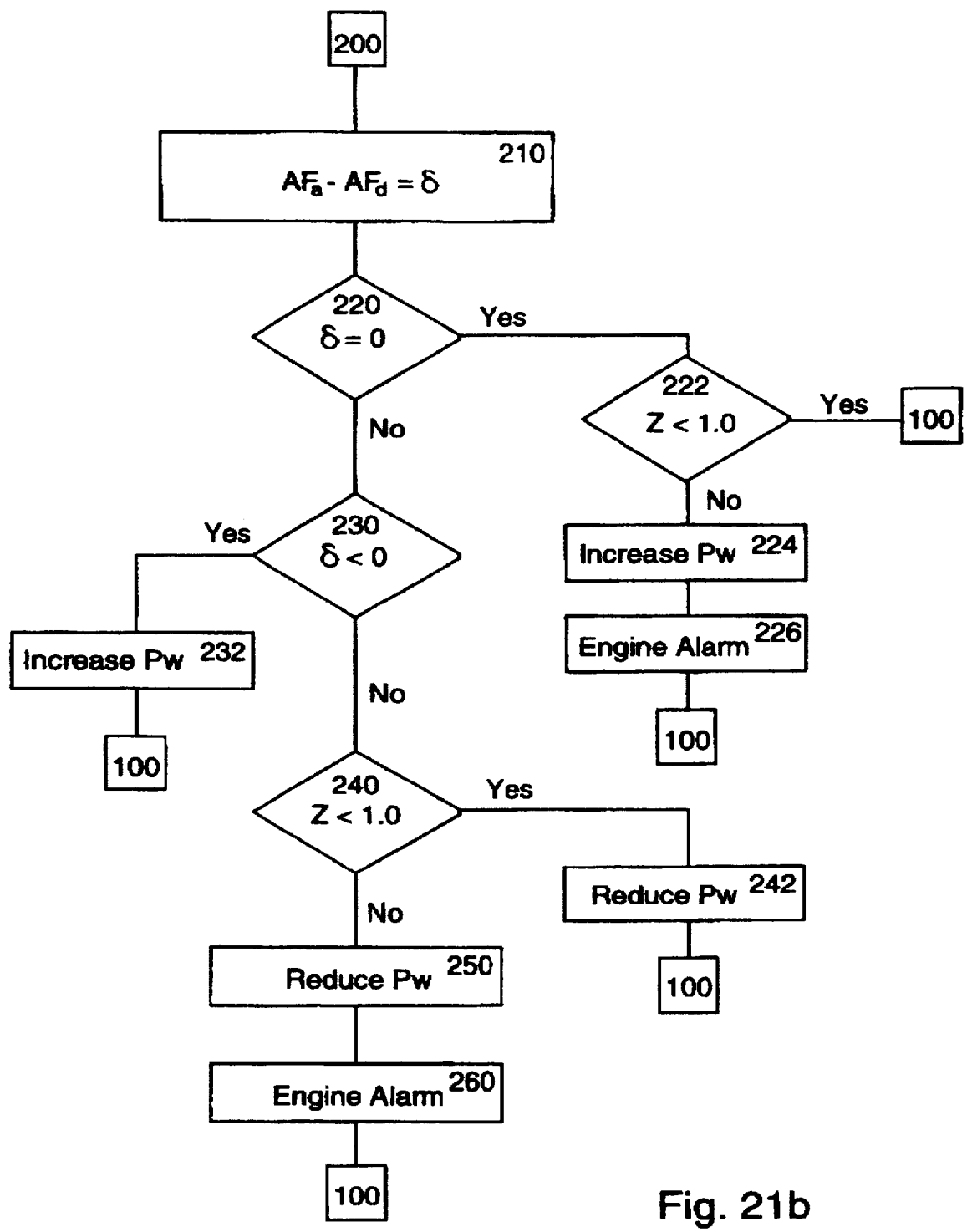
Figure 22:
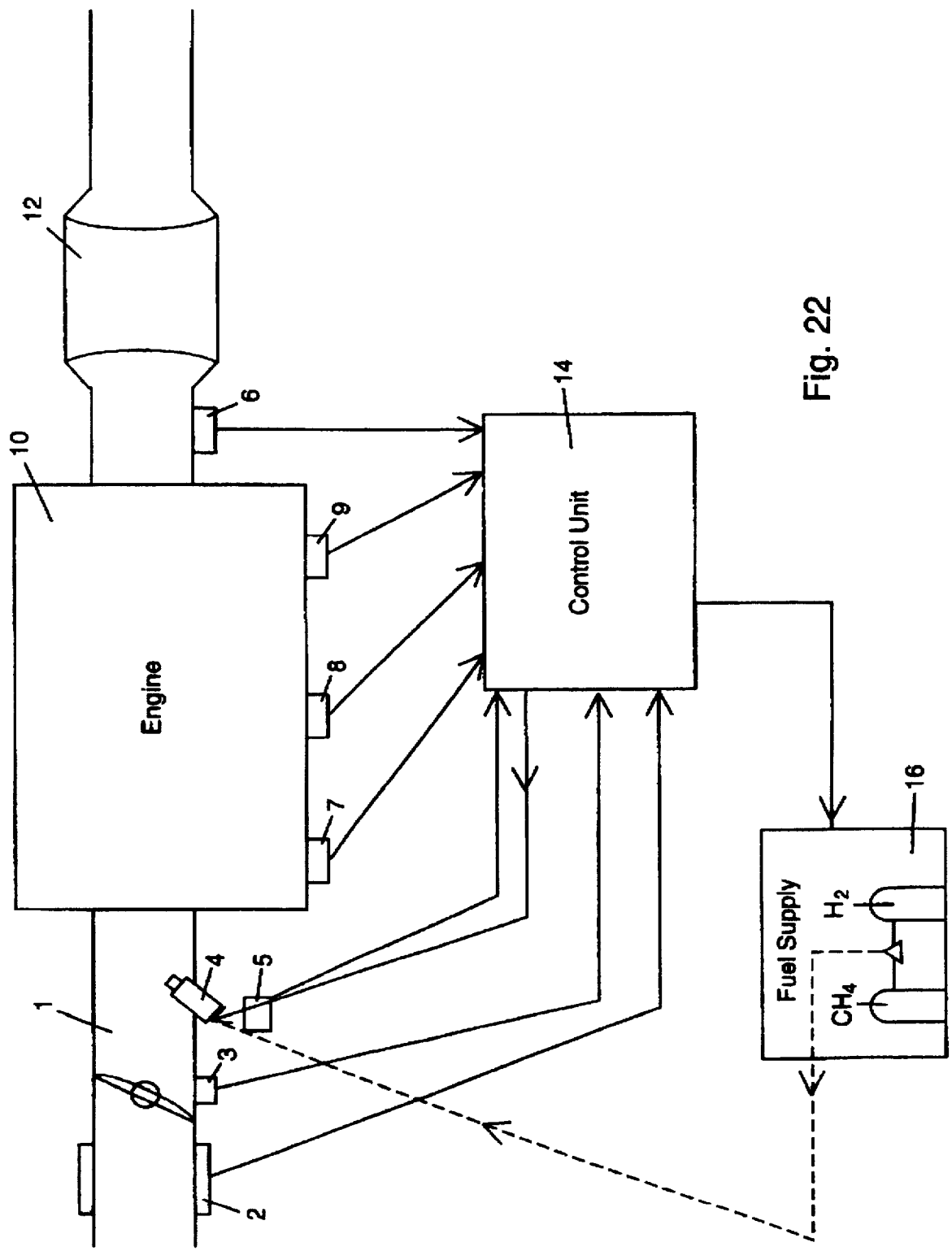
FIG. 22 is a schematic diagram showing a preferred system control connections for using the throttle control invention.

This portion of the invention covers a variable air/fuel ratio control that optimizes emissions and power output for lean burn applications. FIG. 21A and 21B is a Flow chart showing a preferred operation of the throttle control invention. FIG. 22 is a schematic diagram showing a preferred system control connections for using the throttle control invention. Before discussing these Figures, a background for this invention will now be discussed.

Test results have indicated that Spark Ignition(SI) engines can operate at an equivalence ratio of approximately 0.5 with approximately 35% by volume hydrogen in methane. The emissions during this test were $NO_x$ of approximately 8 ppm and HC or approximately 845 ppm. This test was conducted on the engine previously discussed. Maximum engine horsepower was 93 at an equivalence ratio of approximately 0.625 while maximum horsepower was 24 at an equivalence ratio of 0.5. Thus, the optimum equivalence ratio is a function of desired emissions, and horsepower. Varying the equivalence ratio dynamically will provide a vehicle with needed horsepower while minimizing the emissions from the vehicle. The optimum equivalence ratio is thus a function of the percentage of hydrogen enrichment, selected $NO_x$ (Noxious Oxide) and HC (Hydro Carbon) levels, engine design configuration(cylinder size, cylinder displacement, head dimensions, and the like) as well as desired power output A system optimized for these parameters(hydrogen enrichment, $NO_x$, HC, engine design) will produce less power than could be produced if the engine were operated approximately at stoichiometric. With this system, the emission levels of $NO_x$, and controlled HC's will be on the order of approximately 25 ppm or less. In addition the CO output will be on the order of approximately 1% of less. These levels of emission would qualify the vehicle for ULVE(Ultra Low Vehicle Emission) status as established by the California Air Resources Board(CARB). The system for introducing fuel and air into the engine can utilize either a carburetion system or a fuel injection system as described previously in the background section of the invention. However, the prior art systems are still limited because additional power would be required for severe grade climbing, expressway merging and passing. In the prior art systems a wide open throttle could still cause the engine to not produce sufficient power for these extreme conditions. In the subject invention, the air/fuel ratio can be shifted during the wide open throttle toward stoichiometric. Thus, in the instant invention, the air/fuel ratio is shifted toward stoichiometric as a function of the instantaneous power demand.

The novel throttle control can use a "carburetor" or "fuel injection" system. For a carbureted system, a secondary demand regulator system can be operated in parallel with the standard demand regulator system. The standard demand regulator system can be adjusted to maintain an optimal air/fuel ratio. When the throttle blades in the primary system are wide open the secondary system is activated. The secondary system supplies additional fuel to the system as a function of the system demand and the throttle pedal position.

FIG. 21A and 21B is a Flow chart showing a preferred operation of the throttle control invention. In the injection system, the standard electronic control unit(ECU) such as the control unit 10 of U.S. Pat. No. 4,730,590 to Sagawa, which is incorporated by reference, can be programed to implement the algorithm. Referring to FIG. 21, From Start, step 110 is to calculate engine speed(rpm) N, mass air flow Q, and mass fuel flow $F_f$. Step 120 is to calculate throttle position $T_p$, velocity of throttle position $dT_p/dt$, and acceleration of throttle position $d^2T^p/dt^2$. Step 130 is calculate current emissions. Step 140 is calculate desired air fuel ratio $AF_d$ which is a function of acceptable emission levels, desired vehicle speed and acceleration values computed above. Step 150 is to calculate actual air fuel $AF_a$ which is calculated from Q and $F_f$. Step 160 is to calculate in-cylinder pressure $C_{pr}$, average in-cylinder pressure $\overline{C_{pr}}$, standard deviation of in-cylinder pressure $\sigma C_{pr}$ and Z value equal to $$Re = \frac{|C_{pr} - C_{pr}|}{\sigma}.$$

Step 200 of FIG. 21A goes to the top of FIG. 21B. Step 210 is to calculate $\delta$ which is equal to the desired air fuel, $AF_d$ minus actual air fuel, $AF_a$. Step 220 holds if $\delta=0$ and $Z<1.0$ at box 222 there is is no change go to step 100. If $\delta=0$ and $Z>1.0$ there is more cylinder pressure variation than is normally expected. Go to step 224 to increase Pw, the pulse width of the injector which will increase fuel, and set an engine alarm, 226 which can be a warning dashboard light that the engine is malfunctioning and that the driver should check the engine. If $\delta<0$, go to step 232 and increase Pw which will increase fuel to the engine and then go to step 100. If $\delta$ is not <0 go to step 240 and check Z. If $Z<1$ go to step 242 and reduce the amount of fuel to the engine, lower Pw, and then go to step 100. If Z is not <1 go to step 250 reduce Pw and set engine alarm 260 that engine is malfunctioning and then go to step 100.

FIG. 22 is a schematic diagram showing a preferred system of the control connections for using the throttle control algorithm of FIGS. 21A and 21B with the internal combustion engine 10 in a mobile vehicle. Air is inducted through the intake manifold 1 and the volume can be measured by sensor 2 whose output is sent to control unit 14 a computer that runs the algorithm flow chart depicted previously in FIGS. 21A and 21B. The position of the throttle blade can be determined by sensor 3. Sensor 3 can be configured such that when the throttle blade is fully open(parallel to intake air) the additional travel of the throttle can occur to indicate an operator(drivers) desire for increased power. Component 4 can be the fuel injector whose Pw pulse width is controlled by control unit 14. As the pulse width to injector 4 is increased, the air fuel ratio ($\phi$) can be increased. Component 5 is the mass fuel flow sensor which also provides input for control unit 14. Component 6 is the emission sensor which can monitor $NO_x$, CO, $CO_2$, THC, NMOG and $O_2$ passing into muffler 12. Sensor 7 is the engine 10 temperature sensor. Sensor 8 is the crank angle sensor used to determine engine 10 speed and which of the cylinder(s) is being fired. Sensor 9 is the in-cylinder pressure transducer for engine 10. For each cylinder of the engine, there is a separate in-cylinder transducer 9. Control unit 14 can also control the fuel passing into injector 4 by fuel supply 16. The fuel supply 16 can store a high pressure mixture of natural gas($CH_4$) and hydrogen($H_2$) in a mixture as that described in relation to the discussion of FIGS. 1–20 previously. Alternatively, fuel supply 16 can store separate containers of natural gas(i.e. $CH_4$) and hydrogen($H_2$). For example, $CH_4$ can be stored in one high pressure cylinder. For separate storage, hydrogen, $H_2$, can be stored either in a high pressure cylinder, in a hydride, or in a cryogenic form. Furthermore, the separately stored hydrogen could be generated on board the vehicle through a reforming process of $CH_4$. When stored separately, the ratio of $CH_4$ and $H_2$ can be varied dynamically and controlled by control unit 14 as a function of output emissions and engine power.

The algorithm in our invention will maintain the air/fuel ratio at the optimum for emission while the engine power is under the control of the throttle. Experimentation indicates that many internal combustion engines will operate best at approximately $\phi$=approximately 0.625. This however needs to be individually determined for each different engine configuration.

The entire system is under the control of the driver. The transition from the fixed air/fuel ratio to the variable air/fuel ratio can be automatic where the driver is unaware of the change. Alternatively, the system can require additional force on the throttle pedal to alert the driver that the vehicle is now being operated in less than the optimal range.

Although the control algorithm embodiment and schematic has been described for use with a hydrogen gaseous fuel, the invention would have applicability to other types of mobile vehicle fuels that can support an extreme lean burn condition.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A control system for varying air and fuel ratios of an internal combustion engines running at lean burn with reduced emissions during cycles for instantaneous power demands comprising:

an internal combustion engine of a mobile vehicle operating on a fuel supply having a mixture of hydrogen and natural gas;

an air fuel control for maintaining fuel supplied to the engine to remain at a selected air fuel ratio to achieve a lean burn condition;

a throttle for controlling the amount of fuel being supplied to the engine, the throttle having a closed position through a fully open position;

a sensor activated by the fully open position of the throttle, wherein the activated sensor causes the air fuel control to increase the percentage of fuel in the selected air fuel ratio; and means for dynamically adjusting mixture ratios of the hydrogen gas and the natural gas supplied to the engine based on engine power and emission.

2. The control system of claim 1, wherein the fuel supply includes:

a mixture of approximately 21 to 50% hydrogen gas and the remainder being natural gas.

3. The control system of claim 1, wherein the fuel supply includes:

a mixture of approximately 28 to 36% hydrogen gas and the remainder being natural gas.

4. The control system of claim 1, wherein the air-fuel control includes:

a carburetor.

5. The control system of claim 1, wherein the air-fuel control includes:

a fuel injection control.

6. The control system of claim 1, where the selected air fuel ratio is controlled by:

engine speed, spark timing, air flow and throttle pedal position.

7. The control system of claim 6, wherein the selected air fuel ratio is further controlled by at least one of:

in-cylinder pressure, exhaust emissions and fuel flow.

8. A method for producing lean burn and low emission rates for an internal combustion engine of a mobile vehicle using a dynamically adjustable alternative fuel as compared to the burn and emission rates of gasoline fuel to achieve a lean burn, comprising the steps of:

feeding an alternative gaseous fuel mixture of above 21 to approximately 50% hydrogen gas and the remainder being natural gas to an internal combustion engine of a mobile vehicle;

operating the air fuel ratio of the vehicle to achieve a lean burn condition without misfiring the engine; and means for dynamically adjusting mixture ratios of the hydrogen gas and the natural gas supplied to the engine based on engine power and emission.

9. A method for producing lean burn and low emission rates for an internal combustion engine of a mobile vehicle using a dynamically adjustable alternative fuel as compared to the burn and emission rates of gasoline fuel to achieve a lean burn condition, comprising the steps of:

feeding an alternative gaseous fuel mixture of approximately 28 to approximately 36% hydrogen gas and the remainder being natural gas to an internal combustion engine of a mobile vehicle;

operating the vehicle engine at an air and fuel equivalence ratio of approximately 0.625 to achieve a lean burn condition without misfiring the engine and means for dynamically adjusting mixture ratios of the hydrogen gas and the natural gas supplied to the engine based on engine power and emission.

* * * * *